(12) United States Patent
Ko et al.

(10) Patent No.: US 8,577,409 B2
(45) Date of Patent: Nov. 5, 2013

(54) MOBILE TERMINAL AND BROADCAST CONTROLLING METHOD THEREOF

(75) Inventors: Young Seok Ko, Seoul (KR); Jae Sun Han, Seoul (KR); Ki Hoa Nam, Uiwang-si (KR); Beom Seok Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 283 days.

(21) Appl. No.: 12/816,273

(22) Filed: Jun. 15, 2010

(65) Prior Publication Data

US 2011/0003613 A1 Jan. 6, 2011

(30) Foreign Application Priority Data

Jul. 1, 2009 (KR) .................. 10-2009-0059742

(51) Int. Cl.
*H04M 1/00* (2006.01)
(52) U.S. Cl.
USPC .............. 455/550.1; 455/3.06; 455/414.1; 455/436; 370/328; 370/338

(58) Field of Classification Search
USPC .......... 455/550.1, 3.06, 414.1, 436; 370/252, 370/432, 390; 725/58, 34, 28, 25, 113
See application file for complete search history.

(56) References Cited

U.S. PATENT DOCUMENTS

| | | | |
|---|---|---|---|
| 2007/0143781 A1* | 6/2007 | Jo ................................ | 725/25 |
| 2008/0127243 A1* | 5/2008 | Furutani et al. ................ | 725/28 |
| 2008/0305737 A1* | 12/2008 | Childress et al. ............. | 455/3.05 |
| 2009/0133071 A1* | 5/2009 | Sakai et al. .................... | 725/46 |

* cited by examiner

*Primary Examiner* — Chuong A Ngo
(74) *Attorney, Agent, or Firm* — Lee, Hong, Degerman, Kang & Waimey

(57) ABSTRACT

A mobile terminal and broadcast controlling method thereof are disclosed. The present invention includes receiving a broadcast control information on a broadcast content from an external terminal, identifying the broadcast content corresponding to the received broadcast control information using a broadcast relevant information, setting the received broadcast control information on the identified broadcast content, and controlling an output operation of the identified broadcast content according to the set broadcast control information.

18 Claims, 39 Drawing Sheets

MOBILE TERMINAL AND BROADCAST CONTROLLING METHOD THEREOF

Pursuant to 35 U.S.C. §119(a), this application claims the benefit of earlier filing date and right of priority to Korean Application No. 10-2009-0059742, filed on Jul. 1, 2009, the contents of which are hereby incorporated by reference herein in their entirety.

BACKGROUND OF THE INVENTION

1. Field of the Invention

The present invention relates to a mobile terminal, and more particularly, to a mobile terminal and broadcast controlling method thereof. Although the present invention is suitable for a wide scope of applications, it is particularly suitable for controlling a broadcast content output operation.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Generally, a broadcast receiving terminal outputs a broadcast content in a manner of receiving broadcast relevant information provided by a broadcast provider and then outputting the broadcast content using the received broadcast relevant information.

In case of attempting to control a broadcast output operation, a broadcast receiving terminal receives an input of a command signal for controlling a broadcast output from a user and then performs a control operation corresponding to the inputted control command signal.

However, according to the related art, a control action for a broadcast output operation can be inputted in a manner of manipulating the broadcast receiving terminal itself. Moreover, when a control action is inputted using a small mobile terminal, a user may have difficulty in inputting the corresponding control action.

SUMMARY OF THE INVENTION

Accordingly, the present invention is directed to a mobile terminal and broadcast controlling method thereof that substantially obviate one or more problems due to limitations and disadvantages of the related art.

An object of the present invention is to provide a mobile terminal and broadcast controlling method thereof, by which a broadcast content output operation can be controlled according to broadcast control information generated by an external terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a wireless communication unit receiving a broadcast control information on a broadcast content from an external terminal, an output unit outputting the broadcast content, and a controller identifying the broadcast content corresponding to the received broadcast control information using a broadcast relevant information, the controller setting the received broadcast control information on the identified broadcast content, the controller controlling the output unit to perform an output operation of the identified broadcast content according to the set broadcast control information.

In another aspect of the present invention, a method of controlling a broadcast in a mobile terminal includes the steps of receiving a broadcast control information on a broadcast content from an external terminal, identifying the broadcast content corresponding to the received broadcast control information using a broadcast relevant information, setting the received broadcast control information on the identified broadcast content, and controlling an output operation of the identified broadcast content according to the set broadcast control information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 7 to 9 are diagrams for screen configurations of a process for designating preferred content setting information to content control information using a broadcast control information input terminal according to the present invention;

FIG. 10 is a diagram for screen configuration of a process for designating blocked content setting information to content control information using a broadcast control information input terminal according to the present invention;

FIG. 11 is a diagram for screen configuration of a process for designating allowable content setting information to content control information using a broadcast control information input terminal according to the present invention;

FIGS. 12 to 14 are diagrams for screen configurations of a process for designating viewing restriction condition setting information to content control information using a broadcast control information input terminal according to the present invention;

FIG. 16A and FIG. 16B are diagrams for screen configurations of a process for designating comment information to content control information using a broadcast control information input terminal according to the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
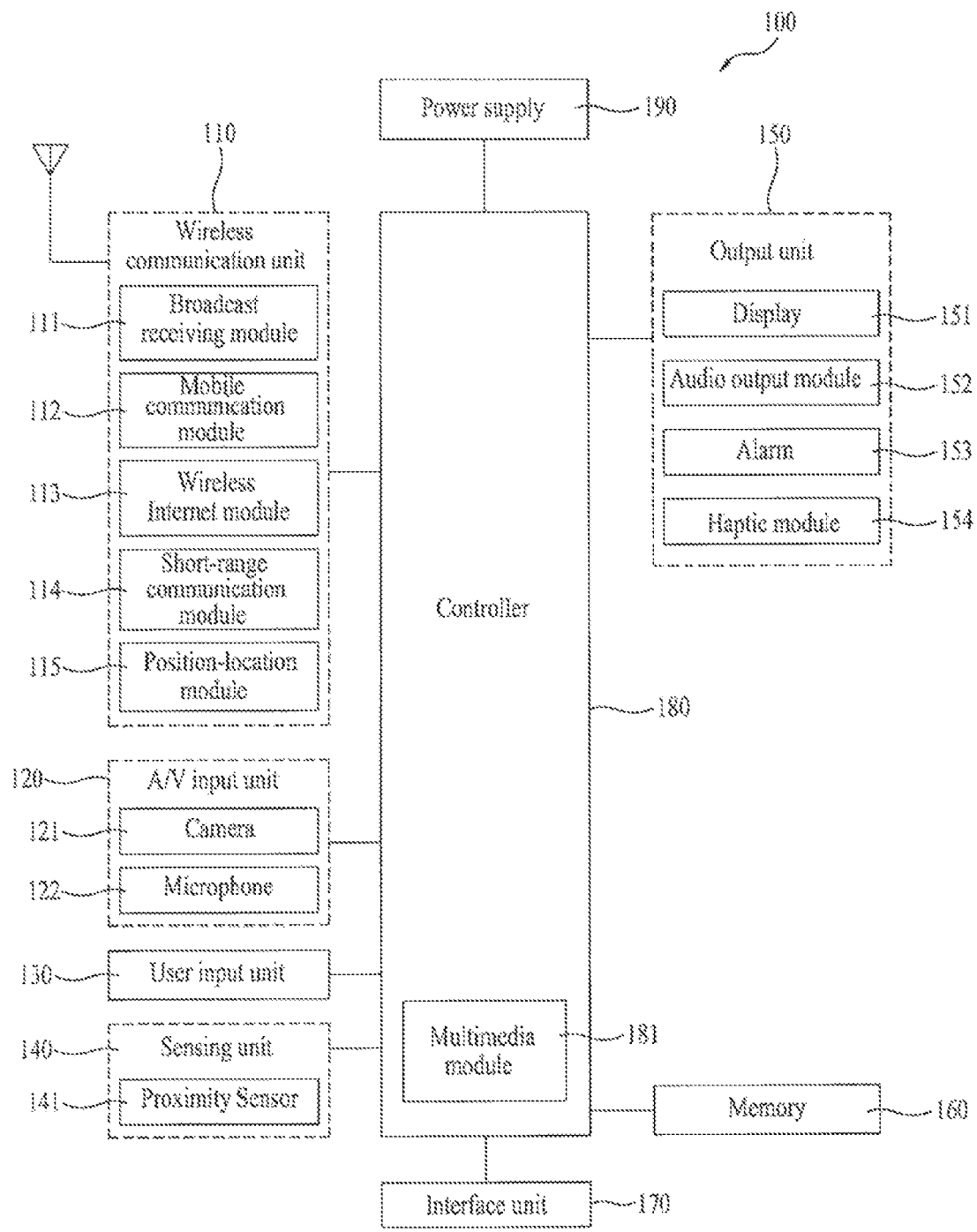
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
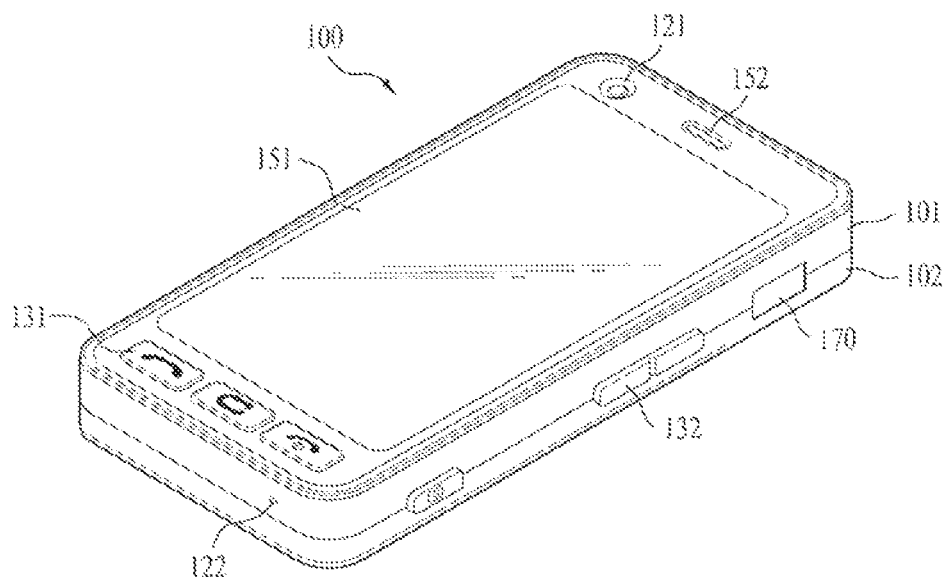
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
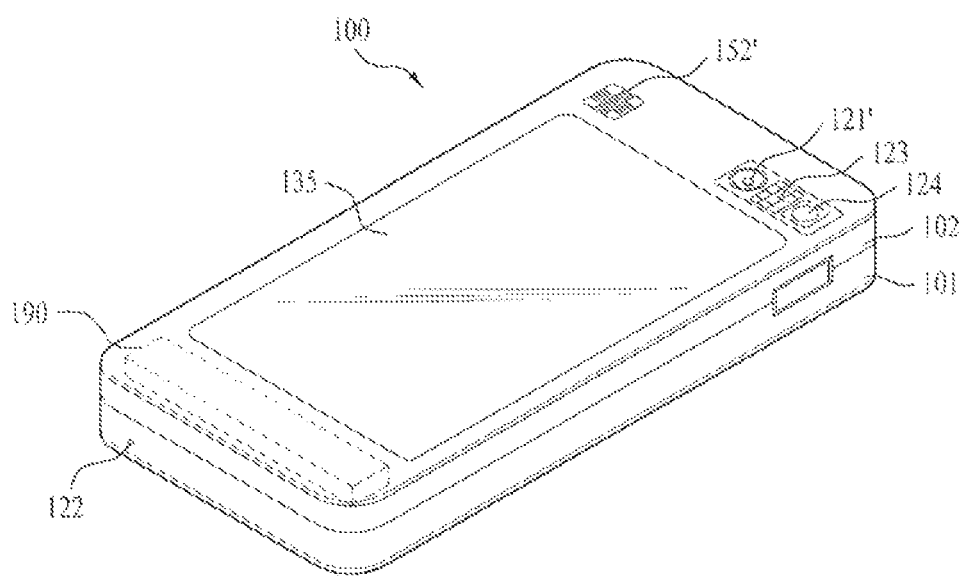
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

The proximity sensor 141 described with reference to FIG. 1 is explained in detail with reference to FIG. 3 as follows.

Figure 3:
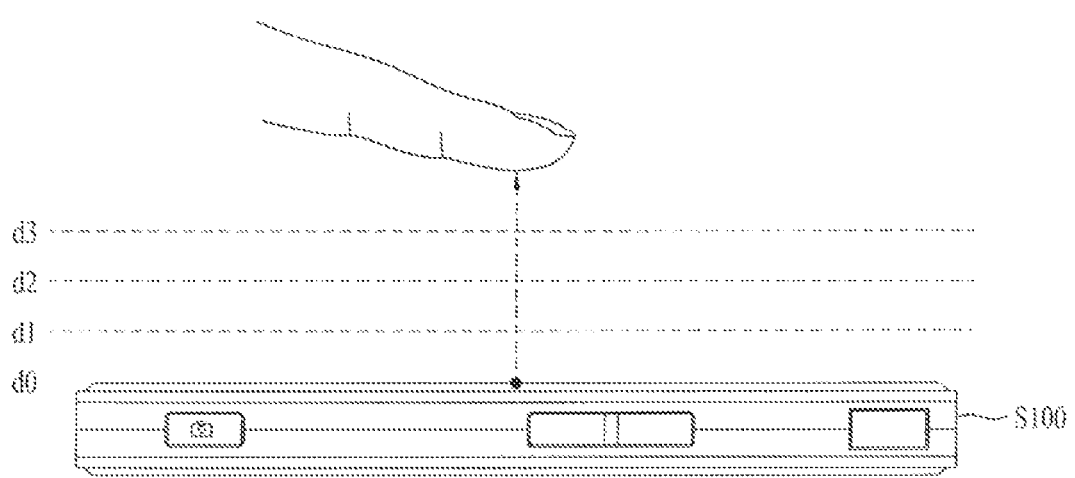
FIG. 3 is a diagram to explain the concept of proximity depth of a proximity sensor.

FIG. 3 is a conceptional diagram for explaining a proximity depth of a proximity sensor.

Referring to FIG. 3, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 can be configured to output a different proximity signal according to a distance between the pointer and the proximity-touched touchscreen (hereinafter named 'proximity depth).

In FIG. 3, exemplarily shown is a cross-section of the touchscreen provided with a proximity sensor capable to three proximity depths for example. And, it is understood that a proximity sensor capable of proximity depths amounting to the number smaller than 3 or equal to or greater than 4 is possible.

In detail, in case that the pointer is fully contacted with the touchscreen (d0), it is recognized as a contact touch. In case that the pointer is located to be spaced apart from the touchscreen in a distance smaller than d1, it is recognized as a proximity touch to a first proximity depth. In case that the pointer is located to be spaced apart from the touchscreen in a distance between d1 and d2, it is recognized as a proximity touch to a second proximity depth. In case that the pointer is located to be spaced apart from the touchscreen in a distance smaller than d3 or equal to or greater than d2, it is recognized as a proximity touch to a third proximity depth. In case that the pointer is located to be spaced apart from the touchscreen in a distance equal to or greater than d3, it is recognized as a proximity touch is released.

Hence, the controller 180 is able to recognize the proximity touch as one of various input signals according to the proximity depth and position of the pointer. And, the controller 180 is able to perform various operation controls according to the various input signals.

Figure 4A:
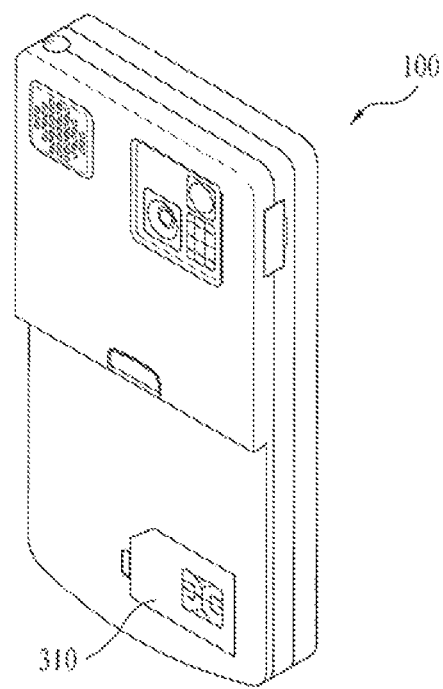
FIG. 4A and FIG. 4B are perspective diagrams of a mobile terminal according to one embodiment of the present invention.
Figure 4B:
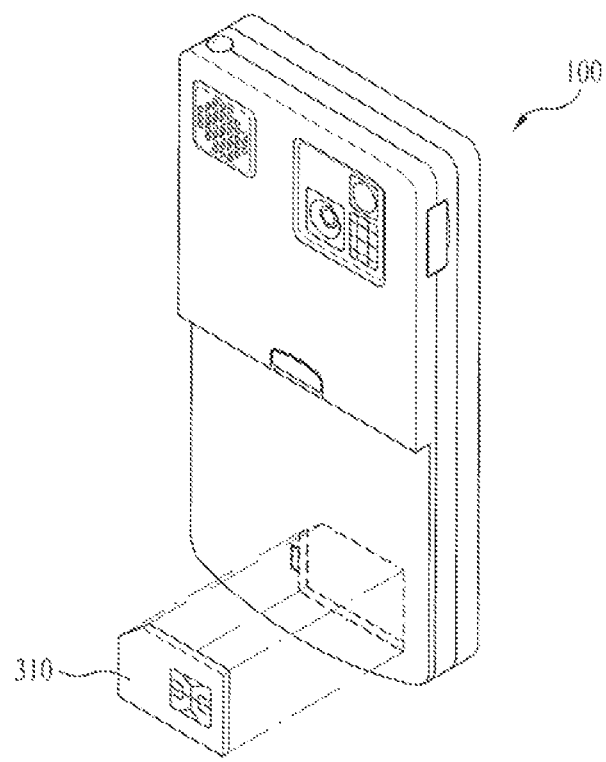

FIG. 4A and FIG. 4B are perspective diagrams of backside of a mobile terminal according to one embodiment of the present invention, which show an identity device loaded/unloaded in/from the mobile terminal. In this case, the identity device can include a SIM card for example.

Referring to FIG. 4A and FIG. 4B, an identity device 310 is detachably provided to the mobile terminal 100. Therefore, an old identity device can be replaced by a new identity device in the mobile terminal 100. Of course, the identity device 310 can be loaded in the mobile terminal 100 in a manner of being connected to the interface unit 170. Alternatively, the identity device 310 can be loaded in the mobile terminal 100 in a manner of being connected to a connector separately provided for the connection to the identity device 310.

The mobile terminal 100 authenticates overall use authority over the mobile terminal 100 or is able to authenticate broadcast viewing/purchase authority using the mobile terminal 100.

Besides, a connecting means (not shown in the drawing) for connecting the identity device 310 and the mobile terminal 100 together can be provided to any one of a backside, a lateral side and a front side of the mobile terminal 100.

Although FIG. 4A and FIG. 4B show the mechanism of loading/unloading the identity device in/from the mobile terminal, it is apparent that the present invention is applicable to a prescribed mobile terminal failing to be provided with a detachable identity device.

In the following description, it is able to assume that a mobile terminal includes at least one of the elements shown in FIG. 1.

A broadcast control information input terminal mentioned in this disclosure can include a terminal configured to designate broadcast control information on a broadcast content according to a user action and to transmit the designated broadcast control information to a mobile terminal.

A broadcast content mentioned in this disclosure includes at least one of a broadcast channel and a broadcast program and is also able to include at least one of a real-time content and a non-real-time content. Moreover, a broadcast content can include at least one of a mobile broadcast content provided via a mobile broadcasting network and an internet broadcast content provided via Internet.

Broadcast control information mentioned in this disclosure is the information for controlling a broadcasting operation of a broadcast content. The broadcast control information can include at least one of a preferred content setting information on a broadcast content, a blocked content setting information, an allowable content setting information, a viewing restriction condition setting information, a viewing inducement content setting information, a broadcast control validity condition information, and a comment information, each of which shall be explained in the following description with reference to the accompanying drawings.

Broadcast relevant information mentioned in this disclosure is the information required for broadcasting a broadcast content. The broadcast relevant information can include broadcast content identification information (e.g., ID, title, ID No., etc.), genre/viewable age/pay or free information of a broadcast content, broadcast duration/characters/synopsis information of a broadcast content and the like.

In the following description, a communication system for implementing the present invention is explained in detail with reference to FIG. 5A.

Figure 5A:
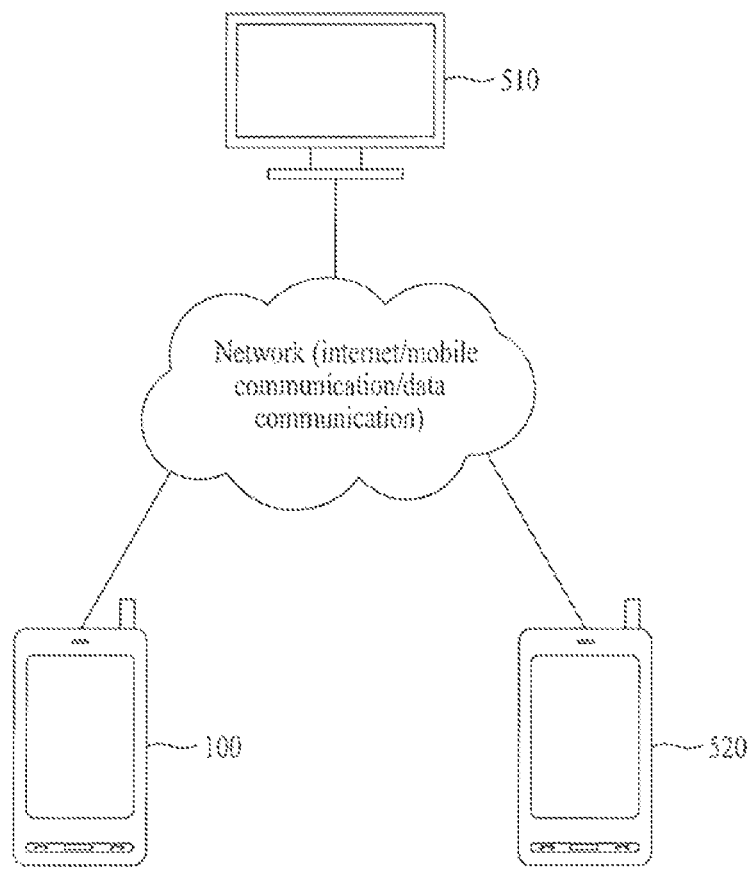
FIG. 5A is a diagram of a structure of a communication system including a mobile terminal and a broadcast control information input terminal according to one embodiment of the present invention.

FIG. 5A is a diagram of a structure of a communication system including a mobile terminal and a broadcast control information input terminal according to one embodiment of the present invention.

Referring to FIG. 5A, a communication system includes a mobile terminal 100, a mobile terminal 520 and a broadcast control information input terminal 510 capable of communicating with the mobile terminals 100 and 520 via network. For instance, the network can include one of Internet, a mobile communication network, a data communication network (e.g., WiBro, WiMax, Wi-Fi, etc.) and the like.

According to the present invention, the broadcast control information input terminal 510 receives an input of a broadcast control information designating action for a broadcast content from a user and is then able to designate broadcast control information to the broadcast content to correspond to the inputted action. And, the broadcast control information input terminal 510 is able to transmit the designated broadcast control information to each of the mobile terminals 100 and 520 via the network.

Therefore, the mobile terminal 100 identifies the broadcast content corresponding to the received broadcast control information and is able to control an output operation of the identified broadcast content according to the received broadcast control information.

In the following description, components of the broadcast control information input terminal are explained in detail with reference to FIG. 5B.

Figure 5B:
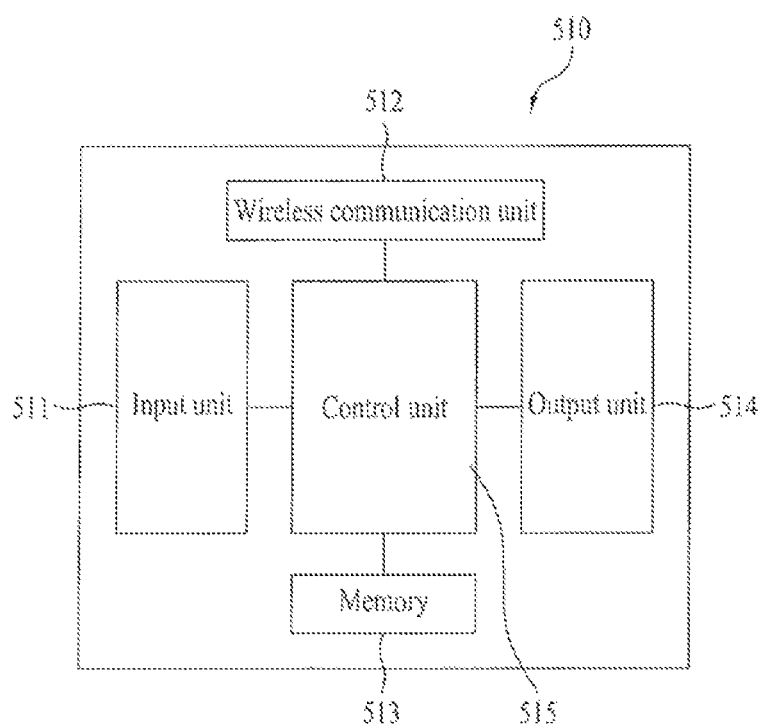
FIG. 5B is a block diagram of a broadcast control information input terminal according to one embodiment of the present invention.

FIG. 5B is a block diagram of a broadcast control information input terminal according to one embodiment of the present invention.

Referring to FIG. 5B, a broadcast control information input terminal 510 includes an input unit 511 receiving an input of a user action, a wireless communication unit 512 performing communication with a mobile terminal, a memory 513 storing broadcast relevant information, an output unit 514 outputting information, and a control unit 515 controlling operations of each of the above components and linked operations between the components.

A user is able to input a designation action of broadcast control information on a broadcast content via the input unit 511. Hereinafter, this broadcast control information shall be named content control information. In doing so, the output unit 514 is able to display the process for designating the content control information under the control of the control unit 515.

The control unit 515 recognizes a broadcast content corresponding to the inputted content control information using the broadcast relevant information stored in the memory 513 and is then able to designate the inputted content control information to the recognized broadcast content.

Afterwards, the wireless communication unit 512 is able to transmit the designated content control information to a control target mobile terminal 100 under the control of the controller 515.

Figure 6:
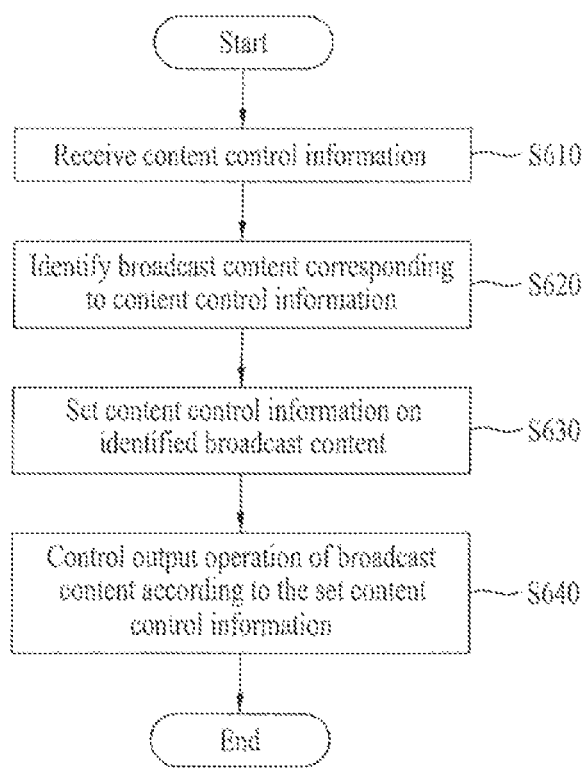
FIG. 6 is a flowchart of a broadcast controlling method of a mobile terminal according to one embodiment of the present invention.

In the following description, a method of controlling a broadcast in a mobile terminal according to the present invention is explained in detail with reference to the accompanying drawings. FIG. 6 is a flowchart of a broadcast controlling method of a mobile terminal according to one embodiment of the present invention.

Referring to FIG. 6, the mobile terminal 100 receives broadcast control information on a broadcast content (hereinafter named content control information) form an external terminal [S610]. In this case, the external terminal includes the aforesaid broadcast control information input terminal 510 or can include a compute available for internet communication with the mobile terminal 100.

For instance, in case that content control information is received via Internet, the content control information can be received using the wireless internet module 113.

The broadcast control information input terminal 510 can receives an input of a content control information designating action from a user before the content control information is transmitted to the mobile terminal 100. Therefore, the broadcast control information input terminal 510 is able to transmit the content control information corresponding to the inputted content control information designating action to the mobile terminal 100.

In the following description, a process for designating content control information using the broadcast control information input terminal 510 according to the present invention is explained in detail with reference to the accompanying drawings.

In particular, broadcast organization information mentioned in the following description is generated using the broadcast relevant information stored in the memory 513 or can include per-broadcast channel broadcast program organization information with reference to broadcast time. The broadcast organization information is provided in formats of tables shown in the following drawings or can be provided as a list.

Figure 7:
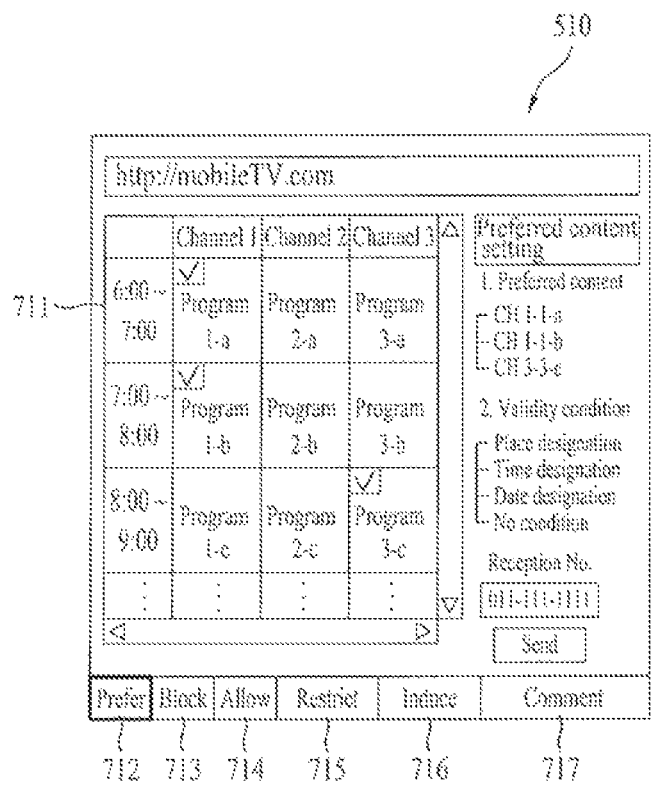
Figure 8A:
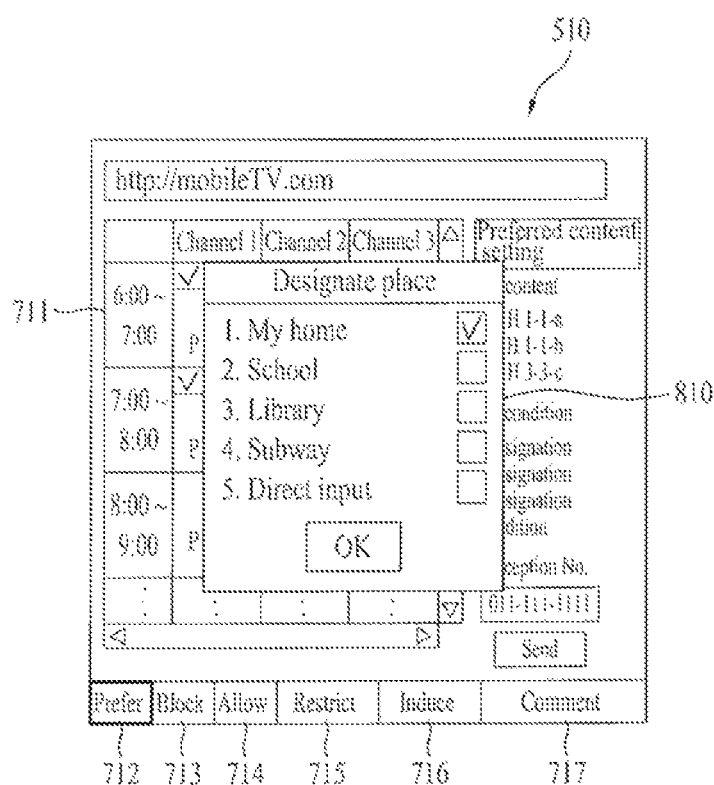
Figure 9:
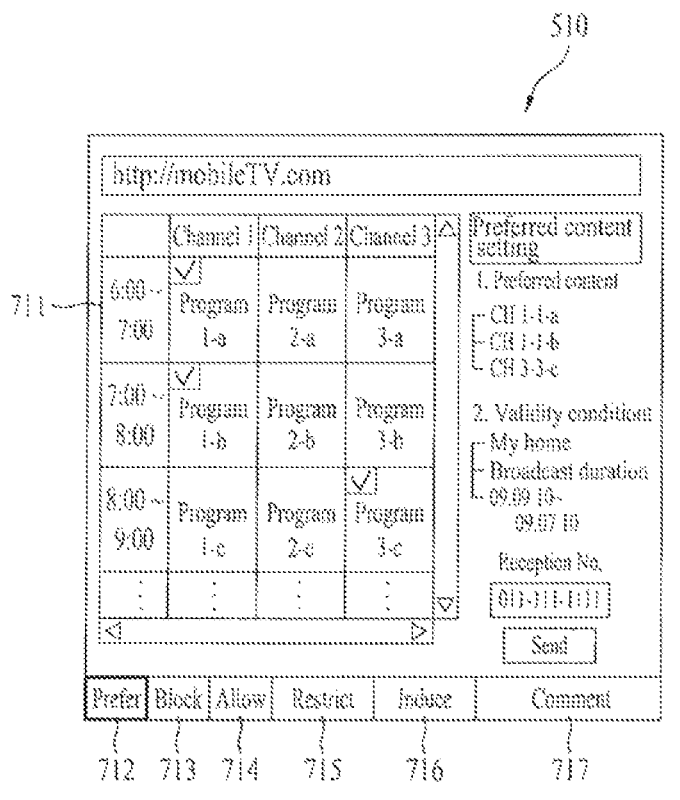

FIGS. 7 to 9 are diagrams for screen configurations of a process for designating preferred content setting information to content control information using a broadcast control information input terminal according to the present invention.

First of all, the broadcast control information input terminal 510 receives an input of a designation command signal for designating preferred content setting information from a user via the input unit 511 and is then able to set a designation available state of the preferred content setting information by the control unit 515. For instance, the designation command signal of the preferred content setting information can be inputted if a corresponding key, a corresponding key region 'preferred' 712 or a corresponding menu item is selected by a user.

Referring to FIG. 7, if the designation available state of the preferred content setting information is set, as mentioned in the foregoing description, the broadcast control information input terminal 510 displays a broadcast organization information 711 on one region of a screen and also displays the preferred content setting information on another region of the screen, using the output unit 514.

For instance, if first to third broadcast contents are selected by a user using the broadcast organization information 711, the output unit 514 is able to display that the first to third broadcast contents are designated to preferred contents.

Moreover, the broadcast control information input terminal 510 is able to designate a place, a time, a date or the like to valid condition information (corresponding to the broadcast control validity condition information) of the preferred content setting information according to a user selection.

If 'place designation' is selected as the validity condition information in FIG. 7, the broadcast control information input terminal 510 displays a place list 810. If so, a user is able to select a specific place using the place list 810 [FIG. 8A]. Moreover, if 'direct input' is selected from the place list 810, the user is able to directly input location information of a specific place. IN this case, the location information (e.g., position information on an administrative district, coordinates information, etc.) on the place configuring the place list 810 can be stored in the memory 513. Therefore, under the control of the control unit 515, the broadcast control information input terminal 510 is able to designate the preferred content setting information in a manner that the preferred content setting information is set to be valid at the place selected from the place list 810 only.

For instance, if 'my home' is selected from the place list 810, the broadcast control information input terminal 510 is able to designate the first to third broadcast contents to the preferred contents in a manner that the first to third broadcast contents are set to be valid as the preferred contents at my home only.

Figure 8B:
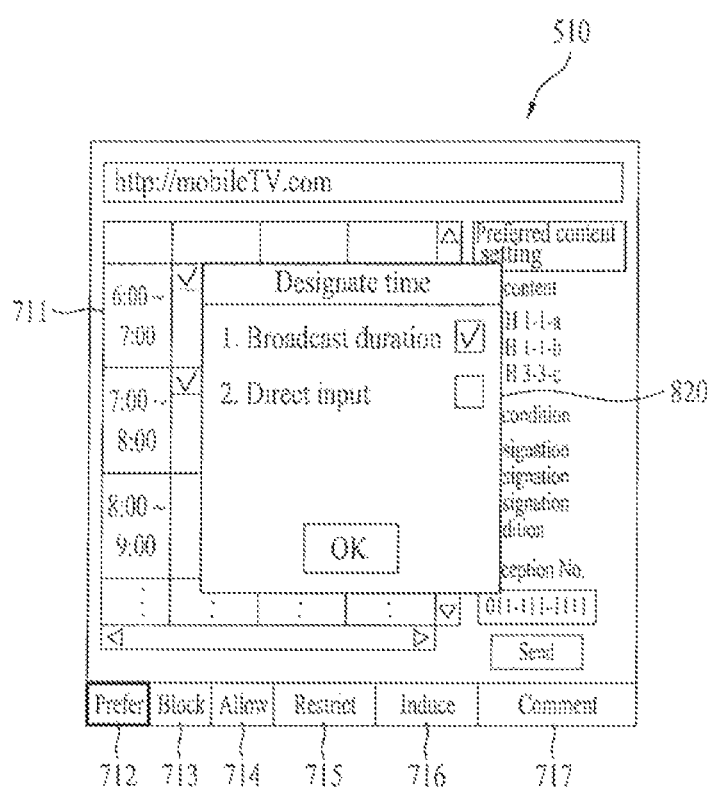

If 'time designation' is selected as the validity condition information in FIG. 7, the broadcast control information input terminal 510 is able to display a window 820 for enabling a user to select a valid time for the preferred content setting information [FIG. 8B]. Therefore, if 'broadcast duration' is selected as the valid time in FIG. 8B, under the control of the control unit 515, the broadcast control information input terminal 510 is able to designate the preferred content setting information to be valid during the broadcast duration of the designated preferred content. Alternatively, the broadcast control information input terminal 510 is able to set the preferred content setting information to be just valid during a directly inputted time if the user directly inputs the time in FIG. 8B.

Figure 8C:
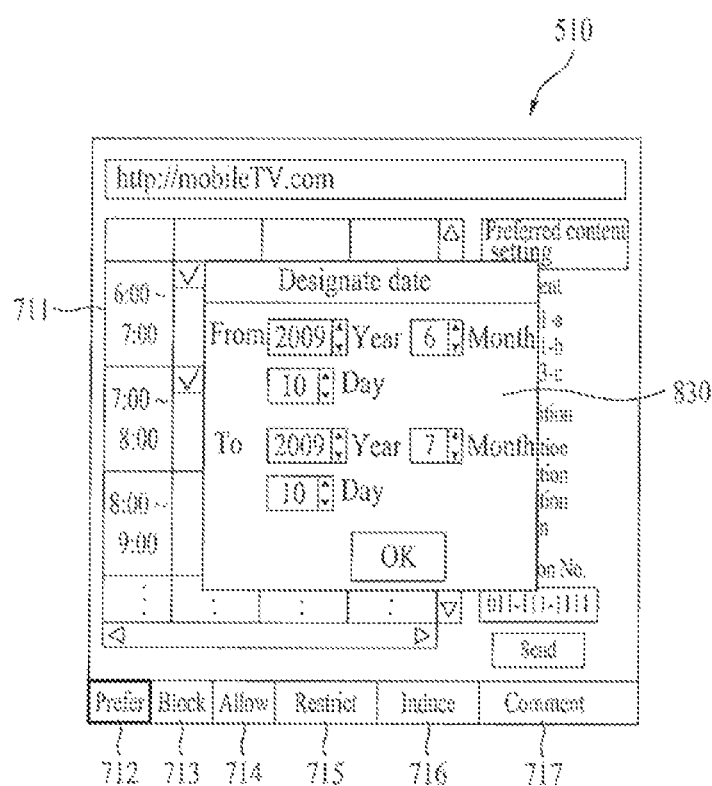

If 'date designation' is selected as the validity condition information in FIG. 7, the broadcast control information input terminal 510 displays a window 830 for enabling a user to select a valid date for the preferred content setting information [FIG. 8C]. Therefore, under the control of the control unit 515, the broadcast control information input terminal 510 is able to designate the preferred content setting information to be valid during valid days inputted by a user in FIG. 8C.

For instance, if the valid days are set to Jun. 10, 2009 ~Jul. 10, 2009, the broadcast control information input terminal 510 is able to designate the first to third broadcast contents designated to the preferred contents in a manner that the first to third broadcast contents are valid as the preferred contents during a period between Jun. 10, 2009 ~Jul. 10, 2009 only.

If 'no condition' is selected as the validity condition information, the broadcast control information input terminal 510 may not designate any validity condition on the preferred content setting information.

Meanwhile, as the validity condition information, a specific genre, a specific viewable age, a presence or non-presence of pay/free content and the like can be included [not shown in the drawing].

Referring to FIG. 9, the broadcast control information input terminal 510 is able to display a preferred content list (CH1-1-a, CH1-1-b and CH3-3-c included) and validity condition information (place designation_my home, time designation_broadcast duration, date designation_09.06.10~09.07.10) on the preferred content setting information.

Therefore, in case of receiving the preferred content setting information and the validity condition information on the preferred content setting information, the mobile terminal 100 is able to set a preferred content to a broadcast content corresponding to the preferred content setting information within a range meeting the validity condition.

Figure 10:
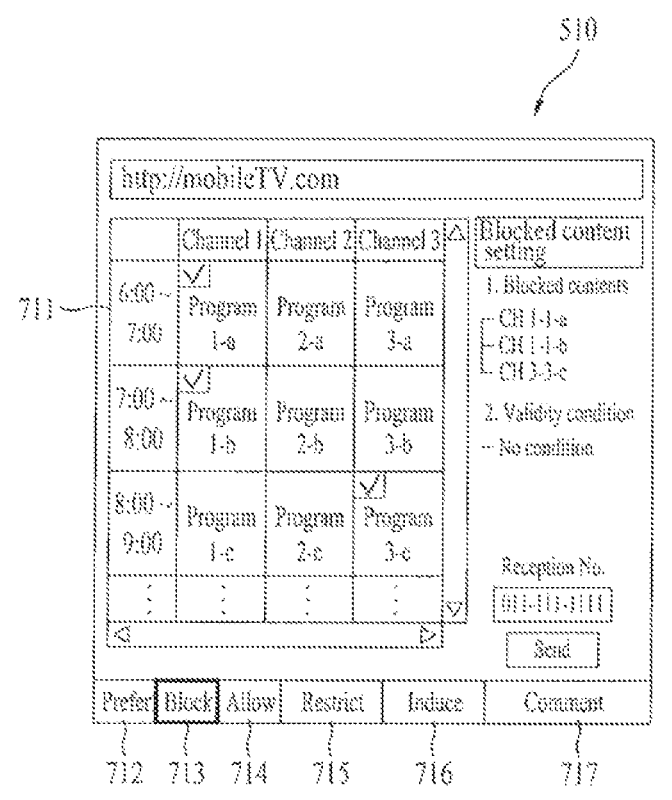

FIG. 10 is a diagram for screen configuration of a process for designating blocked content setting information to content control information using a broadcast control information input terminal according to the present invention.

First of all, the broadcast control information input terminal 510 receives an input of a designation command signal for designating blocked content setting information from a user via the input unit 511 and is then able to set a designation available state of the blocked content setting information by the control unit 515. For instance, the designation command signal of the blocked content setting information can be inputted if a corresponding key, a corresponding key region 'block' 713 or a corresponding menu item is selected by a user.

Referring to FIG. 10, if the designation available state of the blocked content setting information is set, as mentioned in the foregoing description, the broadcast control information input terminal 510 displays a broadcast organization information 711 on one region of a screen and also displays the blocked content setting information on another region of the screen, using the output unit 514.

For instance, if first to third broadcast contents are selected by a user using the broadcast organization information 711, the broadcast control information input terminal 510 is able to designate the first to third broadcast contents to blocked contents. If 'no condition' is selected as the validity condition information, the broadcast control information input terminal 510 may not designate any validity condition on the blocked content setting information.

Referring to FIG. 10, the broadcast control information input terminal 510 is able to display a blocked content list (CH1-1-a, CH1-1-b and CH3-3-c included) and validity condition information (no condition) on the blocked content setting information.

Therefore, in case of receiving the blocked content setting information and the validity condition information on the blocked content setting information, the mobile terminal 100 is able to block a viewing of a broadcast content corresponding to the blocked content setting information within a range meeting the validity condition.

Figure 11:
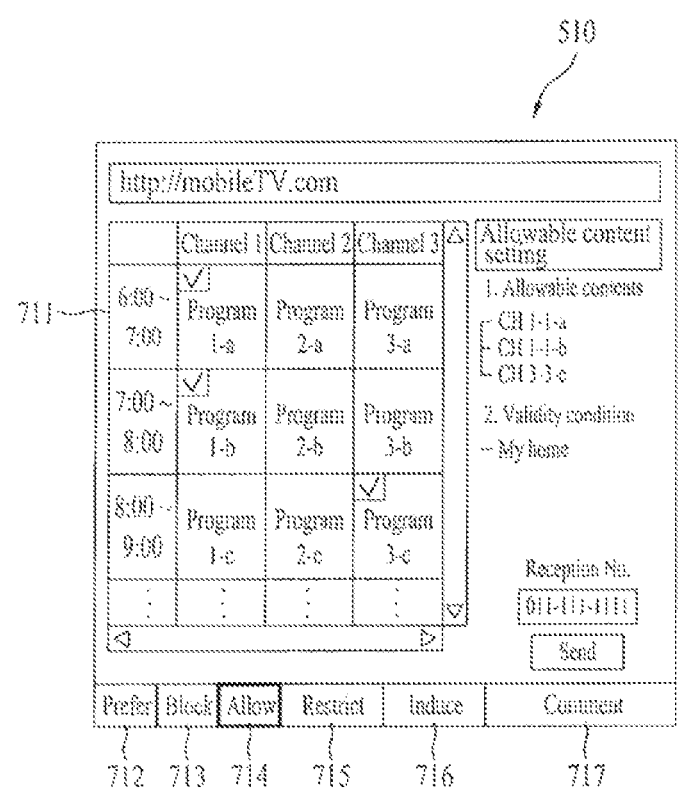

FIG. 11 is a diagram for screen configuration of a process for designating allowable content setting information to content control information using a broadcast control information input terminal according to the present invention.

First of all, the broadcast control information input terminal 510 receives an input of a designation command signal for designating allowable content setting information from a user via the input unit 511 and is then able to set a designation available state of the allowable content setting information by the control unit 515. For instance, the designation command signal of the allowable content setting information can be inputted if a corresponding key, a corresponding key region 'allow' 714 or a corresponding menu item is selected by a user.

Referring to FIG. 11, if the designation available state of the allowable content setting information is set, as mentioned in the foregoing description, the broadcast control information input terminal 510 displays a broadcast organization information 711 on one region of a screen and also displays the allowable content setting information on another region of the screen, using the output unit 514.

For instance, if first to third broadcast contents are selected by a user using the broadcast organization information 711, the broadcast control information input terminal 510 is able to designate the first to third broadcast contents to allowable contents. If 'place designation_my home' is selected as the validity condition information, the broadcast control information input terminal 510 may not designate the allowable content setting information in a manner that the allowable content setting information is valid at my home only.

Referring to FIG. 11, the broadcast control information input terminal 510 is able to display an allowable content list (CH1-1-a, CH1-1-b and CH3-3-c included) and validity condition information (place designation_my home) on the allowable content setting information.

Therefore, in case of receiving the allowable content setting information and the validity condition information on the allowable content setting information, the mobile terminal 100 is able to allow a viewing of a broadcast content corresponding to the allowable content setting information within a range meeting the validity condition.

Figure 12:
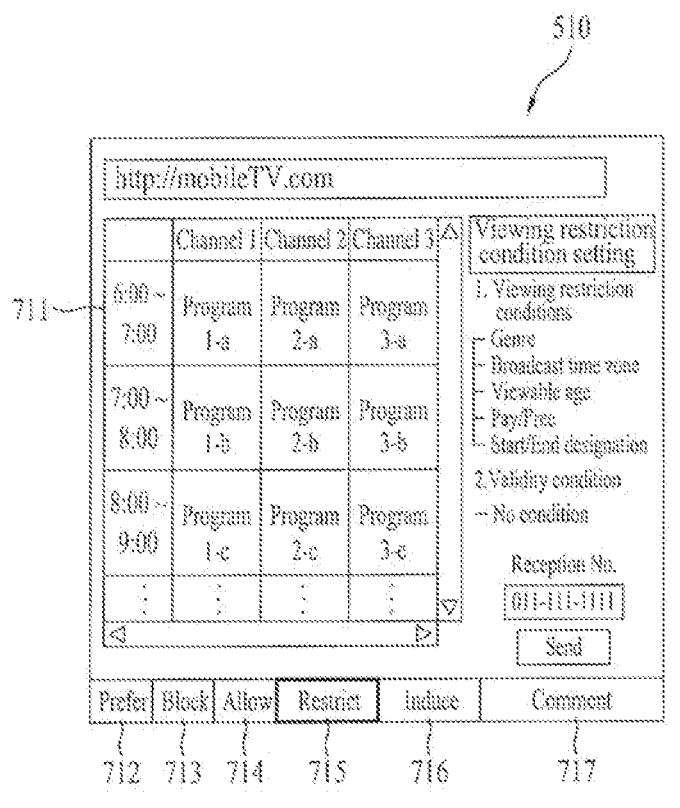
Figure 13A:
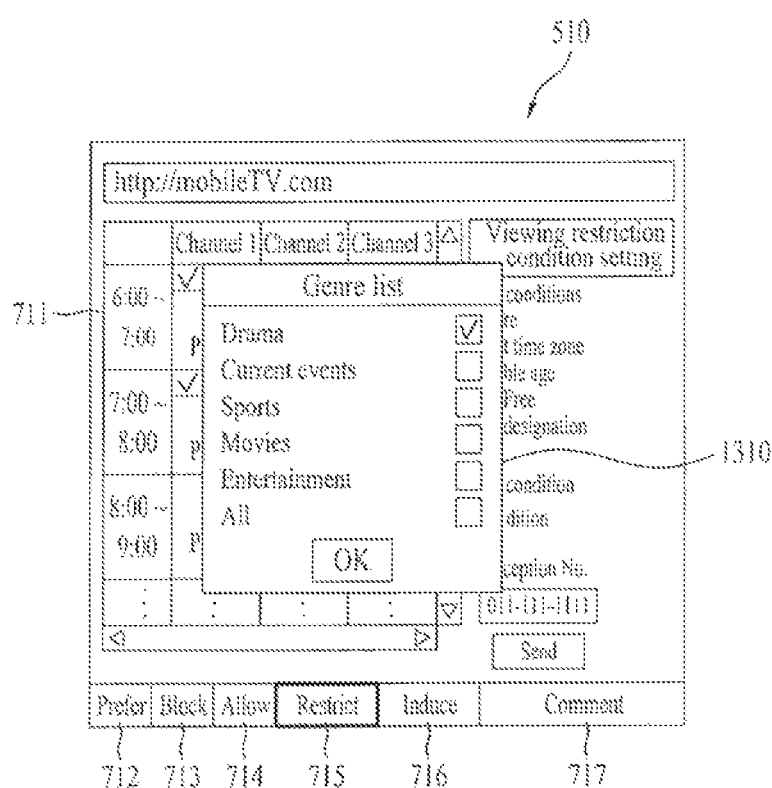
Figure 13B:
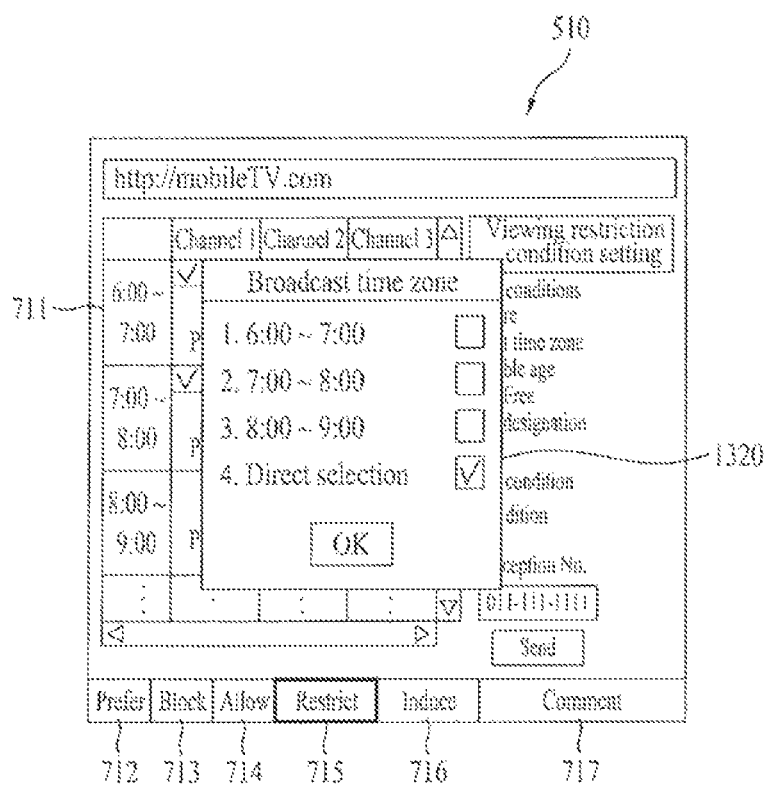
Figure 13C:
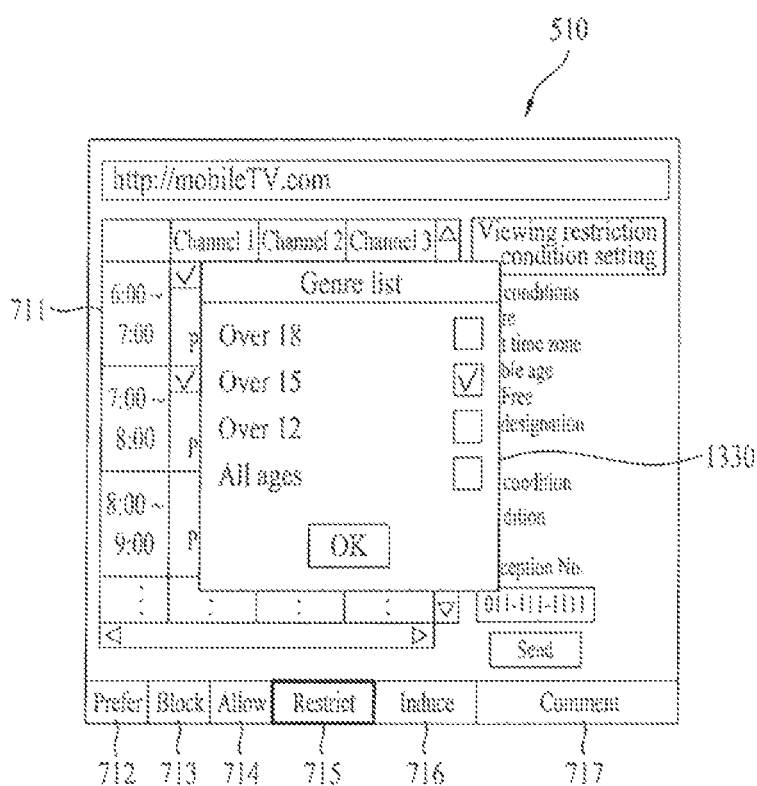
Figure 13D:
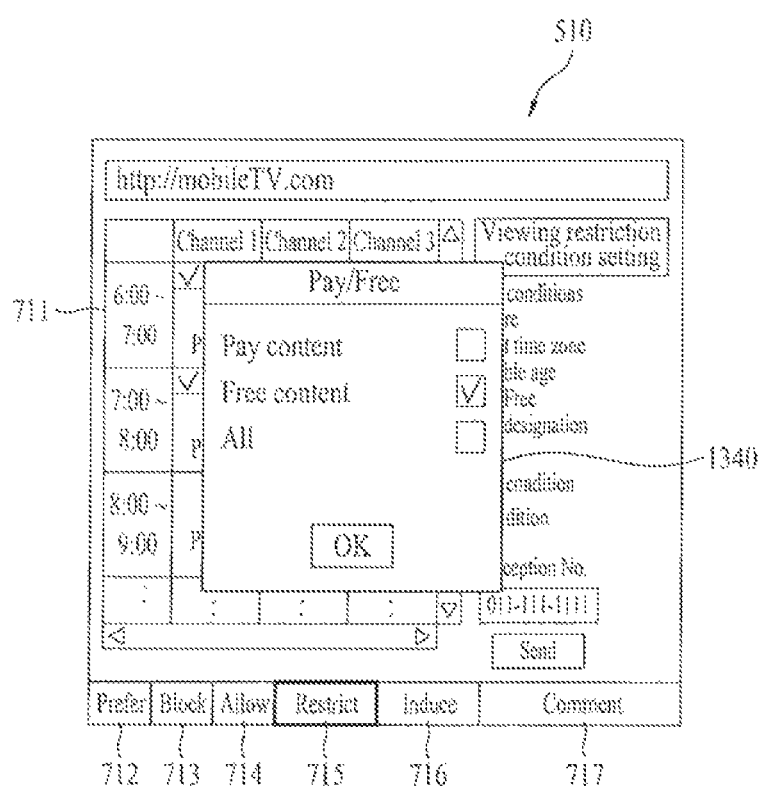
Figure 13E:
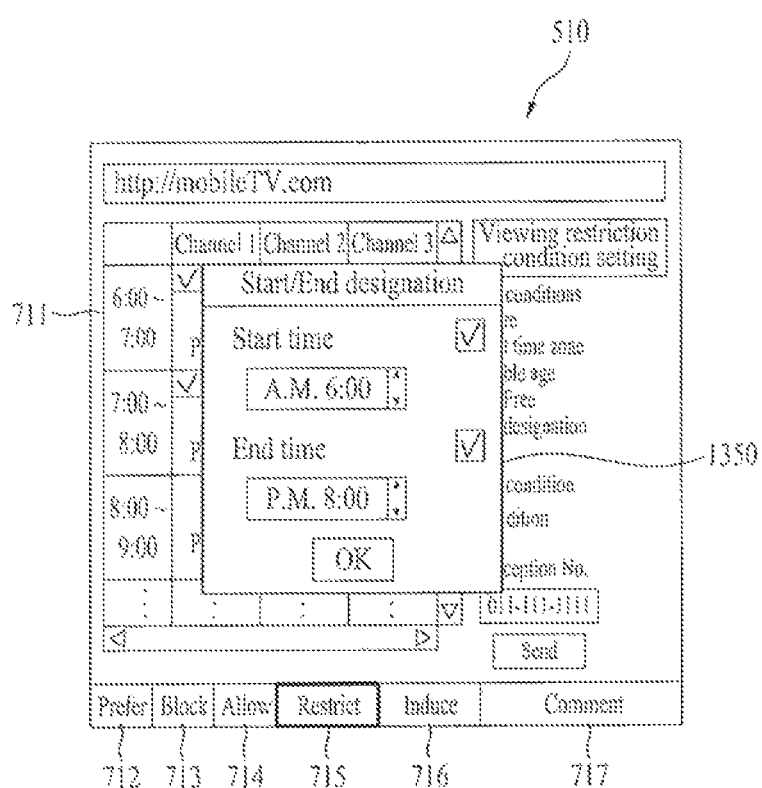
Figure 14:
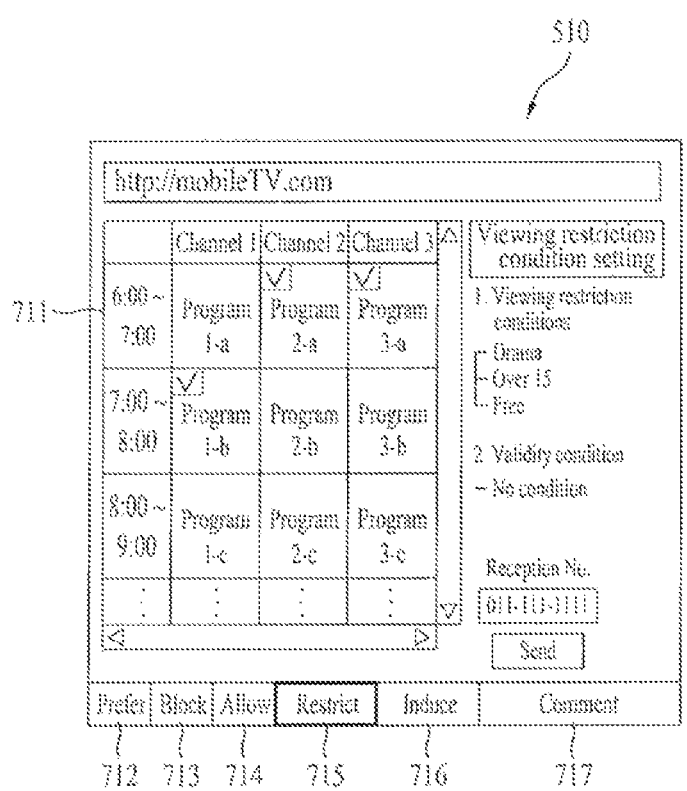

FIGS. 12 to 14 are diagrams for screen configurations of a process for designating viewing restriction condition setting information to content control information using a broadcast control information input terminal according to the present invention.

First of all, the broadcast control information input terminal 510 receives an input of a designation command signal for designating viewing restriction condition setting information from a user via the input unit 511 and is then able to set a designation available state of the viewing restriction condition setting information by the control unit 515. For instance, the designation command signal of the viewing restriction condition setting information can be inputted if a corresponding key, a corresponding key region 'viewing restriction' 715 or a corresponding menu item is selected by a user.

Referring to FIG. 12, if the designation available state of the viewing restriction condition setting information is set, as mentioned in the foregoing description, the broadcast control information input terminal 510 displays a broadcast organization information 711 on one region of a screen and also displays the viewing restriction condition setting information on another region of the screen, using the output unit 514.

If 'genre' is selected as the viewing restriction condition in FIG. 12, the broadcast control information input terminal 510 displays a genre list 1310 and is then able to select a broadcast content corresponding to a genre selected from the genre list 1310 using the broadcast relevant information (per-content genre information included) [FIG. 13A].

If 'broadcast time zone' is selected as the validity condition information in FIG. 12, the broadcast control information input terminal 510 displays a broadcast time zone list 1320 and is then able to select a broadcast content corresponding to a broadcast duration (broadcast duration directly inputted by a user is included) selected from the broadcast time zone list 1320 using the broadcast relevant information (per-content broadcast duration information included) [FIG. 13B].

If 'viewable age' is selected as the validity condition information in FIG. 12, the broadcast control information input terminal 510 displays a viewable age list 1330 and is then able to select a broadcast content viewable at the viewable age selected from the viewable age list 1330 using the broadcast relevant information (per-content viewable age information included) [FIG. 13C].

If 'pay/free' is selected as the viewing restriction condition in FIG. 12, the broadcast control information input terminal 510 displays a window 1340 for enabling a user to select a pay content or a free content and is then able to select a broadcast content corresponding to the pay or free content selected by the user using the broadcast relevant information (per-content pay/free information included) [FIG. 13D].

According to a user selection or a selection made by the broadcast control information input terminal 510, the broadcast control information input terminal 510 is able to designate the broadcast content selected in one of FIGS. 13A to 13D using the viewing restriction condition information to a viewing allowable content (or a viewing blocked content).

If 'start/end point' is selected as the viewing restriction condition in FIG. 12, the broadcast control information input terminal 510 displays a window 1350 for enabling a user to select a viewing start point or a viewing end point and is able to designate the viewing start or end point selected by the user to the viewing restriction condition setting information [FIG. 13E].

Referring to FIG. 14, the broadcast control information input terminal 510 is able to display viewing restriction condition setting information (genre_drama, viewable age_over 15, pay/free_free content) and validity condition information (no condition). Occasionally, a broadcast content list corresponding to the designated viewing restriction condition setting information can be displayed.

Therefore, in case of receiving the viewing restriction condition setting information and the validity condition information on the viewing restriction condition setting information, the mobile terminal 100 is able to output a broadcast content corresponding to the viewing restriction condition setting information within a range meeting the validity condition.

Figure 15:
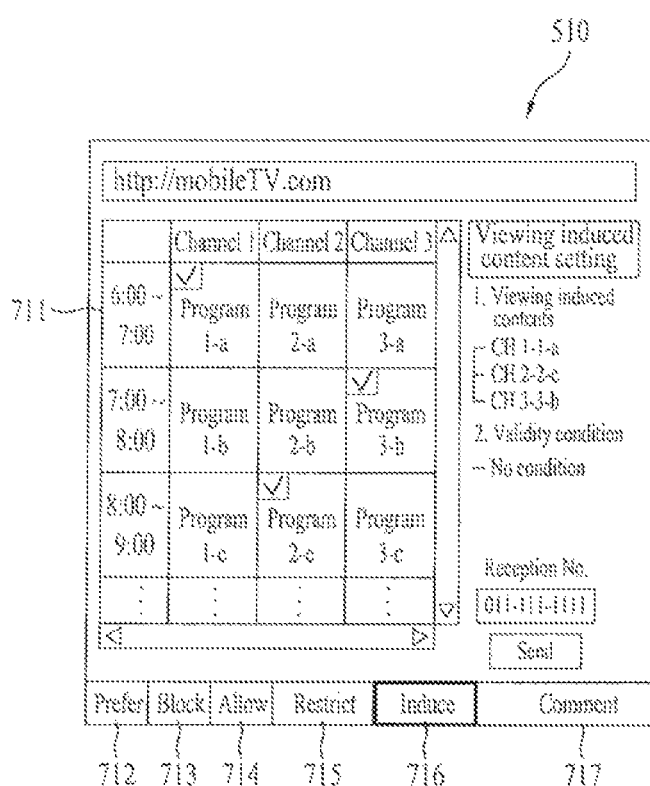
FIG. 15 is a diagram for screen configuration of a process for designating viewing inducement content setting information to content control information using a broadcast control information input terminal according to the present invention.

FIG. 15 is a diagram for screen configuration of a process for designating viewing inducement content setting information to content control information using a broadcast control information input terminal according to the present invention.

First of all, the broadcast control information input terminal 510 receives an input of a designation command signal for designating viewing inducement content setting information from a user via the input unit 511 and is then able to set a designation available state of the viewing inducement content setting information by the control unit 515. For instance, the designation command signal of the viewing inducement content setting information can be inputted if a corresponding key, a corresponding key region 'viewing inducement' 716 or a corresponding menu item is selected by a user.

Referring to FIG. 15, if the designation available state of the viewing inducement content setting information is set, as mentioned in the foregoing description, the broadcast control information input terminal 510 displays a broadcast organization information 711 on one region of a screen and also displays the viewing inducement content setting information on another region of the screen, using the output unit 514.

For instance, if first to third broadcast contents are selected by a user using the broadcast organization information 711, the broadcast control information input terminal 510 is able to designate the first to third broadcast contents to viewing induced contents.

Referring to FIG. 15, the broadcast control information input terminal 510 is able to display a viewing inducement content list (CH1-1-$a$, CH1-1-$b$ and CH3-3-$c$ included) and validity condition information (no condition) on the viewing inducement content setting information.

Therefore, in case of receiving the viewing inducement content setting information and the validity condition information on the viewing inducement content setting information, the mobile terminal 100 is able to induce a broadcast content corresponding to the viewing inducement content setting information to be viewed within a range meeting the validity condition irrespective of the terminal state.

Figure 16A:
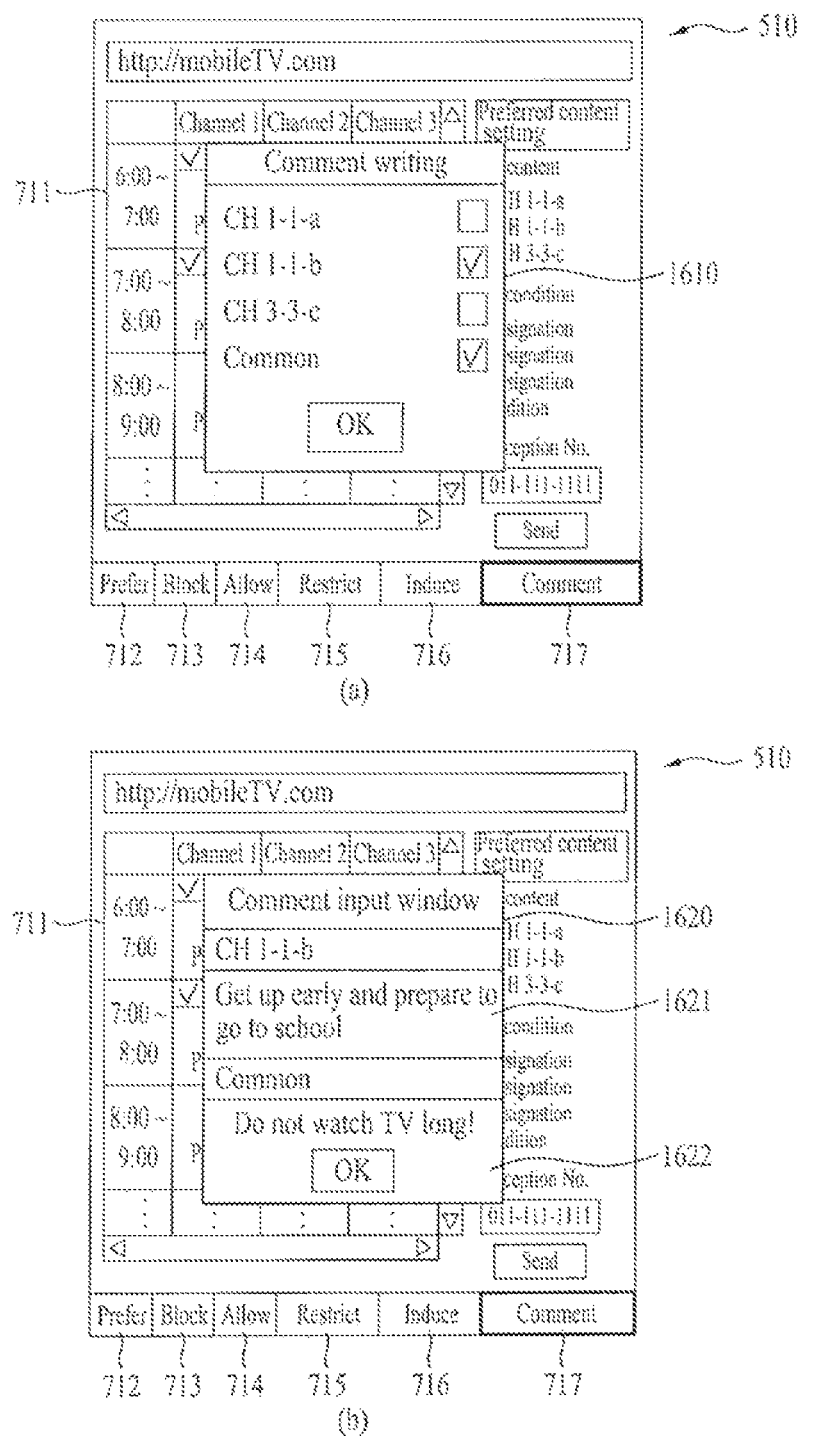
Figure 16B:
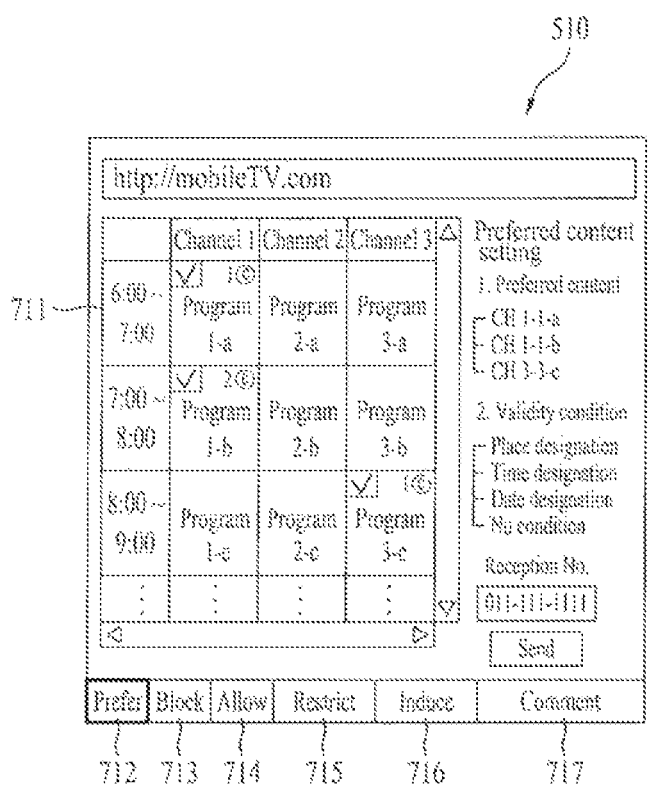

FIG. 16A and FIG. 16B are diagrams for screen configurations of a process for designating comment information to content control information using a broadcast control information input terminal according to the present invention.

First of all, in case that the content control information is designated in one of the above described drawings, the broadcast control information input terminal 510 is able to designate comment information on a broadcast content corresponding to the designated content control information. In this case, the comment information is selected by a user from a plurality of comment information previously stored in the memory 513 or can be directly inputted by a user.

The broadcast control information input terminal 510 enables a user to select a broadcast content (CH1-1-$a$, common) to input comment information. And, the broadcast control information input terminal 510 enables a user to select or input comment information (CH-1-1-$a$_Get up early and prepare to go to school, common_Do not watch TV long!) on the selected broadcast content [FIG. 16A].

The broadcast control information input terminal 510 is able to distinguishably display (o) a broadcast content for which comment information is inputted in the broadcast organization information and is able to display the number (1 or 2) of the inputted comment information.

Therefore, in case of receiving the comment information, the mobile terminal 100 is able to output the received comment information at a viewing start point of the broadcast content corresponding to the received comment information or at a random timing point in the course of the viewing the broadcast content.

In the above-described drawings, after the content control information has been completely inputted, the broadcast control information input terminal 510 receives an input of a number of a reception target terminal from a user. If a transmission command key (send) is selected, the broadcast control information input terminal 510 is able to transmit the designated content control information to the reception target terminal using the wireless communication unit 512. In this case, the reception target terminal can include the mobile terminal 100.

Meanwhile, the broadcast control information input terminal 510 is able to configure a plurality of the broadcast content lists each of which includes at least one broadcast content that is a control target of the content control information [not shown in the drawings]. For instance, each of a plurality of the content lists can include a different content control information.

Referring now to FIG. 6, in case of receiving the content control information in the receiving step S610, the mobile terminal 100 is able to perform a reception announcement operation for announcing a reception of the content control information using the output unit 150 under the control of the controller 180. Regarding this, the following description is made with reference to FIG. 17A and FIG. 17B.

Figure 17A:
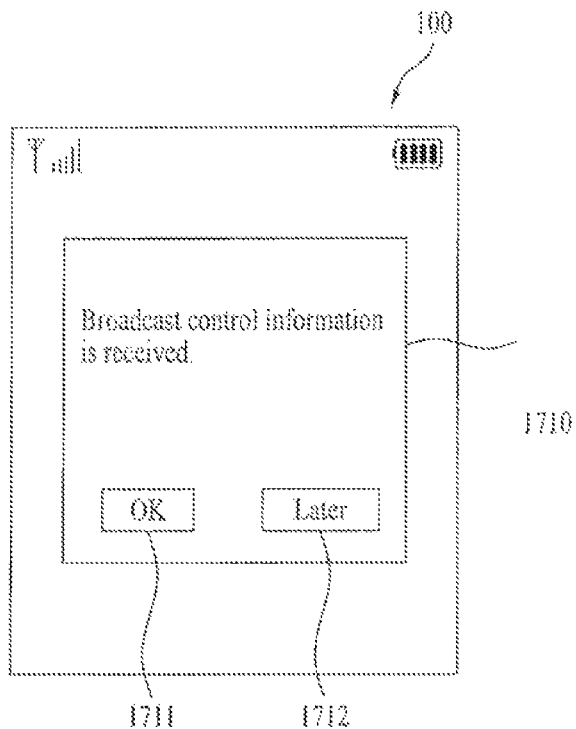
FIG. 17A and FIG. 17B are diagrams for screen configurations of announcing a reception of content control information using a mobile terminal according to the present invention.
Figure 17B:
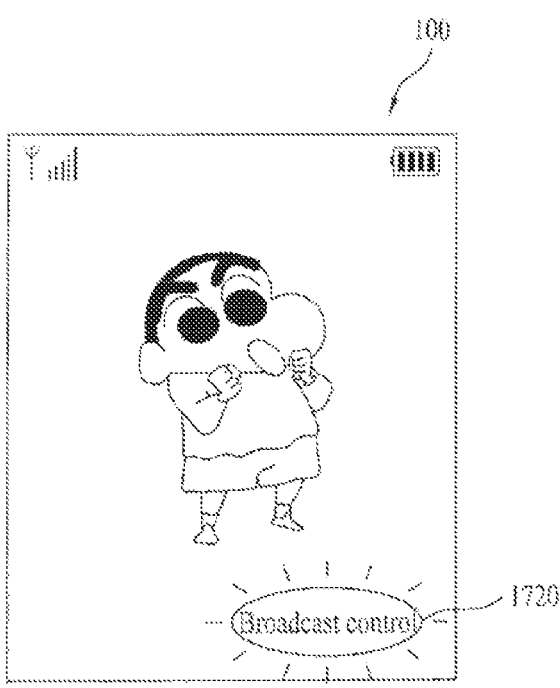

FIG. 17A and FIG. 17B are diagrams for screen configurations of announcing a reception of content control information using a mobile terminal according to the present invention.

Referring to FIG. 17A, in case of receiving content control information, the mobile terminal 100 is able to output a text 1710 (voice, vibration, bell sound and/or the like included) for announcing the reception of the content control information.

If a user selects a region 'OK' 1711 in FIG. 17A, the mobile terminal 100 outputs the received content control information. If a region 'announce later' 1712 is selected, the mobile terminal 100 sets an announcement reservation for the received content control information and is then able to output the reception announcement text 1710 or the received content control information after predetermined duration.

Referring to FIG. 17B, in case of receiving content control information, the mobile terminal 100 is able to output an icon 1720 (image, video, animation, emoticon and/or the like included) for announcing the reception of the content control information.

If a user selects the icon 1720 in FIG. 17B, the mobile terminal 100 is able to output the received content control information.

The announcement action shown in FIG. 17A or FIG. 17B can be performed after completion of identifying and setting steps S620 and S630 explained later. In this case, the mobile terminal 100 is able to output the content control information, which is set in the setting step S630, on a broadcast content identified in the identifying step S620 instead of the content control information received in the receiving step S610.

Referring now to FIG. 6, under the control of the controller 180, the mobile terminal 100 identifies a broadcast content corresponding to the content control information received in the receiving step S610 using the broadcast relevant information [S620].

In this case, the broadcast relevant information is previously stored in the memory 160 or can be received by the wireless communication unit 110. And, the broadcast relevant information can be randomly or periodically received by a request made by the mobile terminal 100 or an arbitrary decision made by a broadcast relevant server. In the content control information, identification information (hereinafter named a first identification information) of a target broadcast content of content control information designated by the broadcast control information input terminal 510 can be included. Moreover, identification information of a broadcast content by the broadcast relevant information provided to the mobile terminal 100 can be called a second identification information.

Moreover, the controller 180 is able to identify a broadcast content using identification information (e.g., first or second identification information) of the broadcast content in the identifying step S620. In this case, the identification information can include an ID, identification number, name and like of the broadcast content.

In the following description, the identifying step S620 is explained in detail according to whether the broadcast control information input terminal 510 and the mobile terminal 100 use the same broadcast relevant information (particularly, the identification information of the broadcast content).

First of all, in case that the same broadcast relevant information is used, the first identification information is identical to the second identification information. Under the control of the controller 180, the mobile terminal 100 searches a broadcast content for which the second identification information identical to the first identification information included in the content control information received in the receiving step S610 is set. The mobile terminal 100 is then able to identify the searched broadcast content as the broadcast content corresponding to the content control information.

Secondly, in case that different broadcast relevant information are used, since the first and second identification information are different from each other, under the control of the controller 180, the mobile terminal 100 searches a broadcast content for which the second identification information is set using matching information of the first identification information included in the content control information received in the receiving step S610 and is then able to identify the searched broadcast content as the broadcast content corresponding to the content control information.

For instance, the broadcast control information input terminal 510 or the mobile terminal 100 is able to store the matching information per broadcast content or can be provided with the matching information per broadcast content by a broadcast relevant server.

In particular, first of all, in case that the broadcast control information input terminal 510 stores or is provided with the matching information, the broadcast control information input terminal 510 enables the matching information corresponding to the first identification information or the second identification information extracted using the matching information to be included in content control information and is then able to transmit the content control information to the mobile terminal 100. Therefore, in case of receiving the matching information, the mobile terminal 100 extracts the second identification information corresponding to the matching information and then identifies the broadcast content having the extracted second identification information set therein. In case of receiving the second identification information, the mobile terminal 100 is able to identify the broadcast content in which the received second identification information is set.

In case that the mobile terminal 100 stores or is provided with the matching information, the mobile terminal extracts the second identification information using the matching information corresponding to the first identification information and is then able to identify the broadcast content having the extracted second identification information set therein.

Under the control of the controller 180, the mobile terminal sets the content control information received in the receiving step S610 for the broadcast content identified in the identifying step S620 [S630].

For instance, in case that the content control information includes the preferred content setting information, the controller 180 is able to set the preferred content to the broadcast content identified in the identifying step S620. In case that the content control information includes the blocked content setting information, the controller 180 is able to set the blocked content to the broadcast content identified in the identifying step S620. In case that the content control information includes the allowable content setting information, the controller 180 is able to set the allowable content to the broadcast content identified in the identifying step S620. In case that the content control information includes the viewing restriction condition setting information, the controller 180 is able to set the viewing restriction condition set content to the broadcast content identified in the identifying step S620. In case that the content control information includes the viewing inducement content setting information, the controller 180 is able to set the viewing inducement content to the broadcast content identified in the identifying step S620. In case that the content control information includes the broadcast control validity condition information, the controller 180 is able to set the validity condition of the received content control information for the broadcast content identified in the identifying step S620. In case that the content control information includes the comment information, the controller 180 is able to set the comment information to be outputted for the broadcast content identified in the identifying step S620.

Afterwards, under the control of the controller 180, the mobile terminal 100 controls an output operation of the broadcast content identified in the identifying step S620 according to the content control information set in the setting step S630 [S640].

In the following description, the controlling step S640 is explained in detail according to a type of the content control information with reference to the accompanying drawings.

First of all, in case that the content control information is set to the preferred control setting information in the setting step S630, the controller 180 distinguishably displays the broadcast content identified in the identifying step S620 on the broadcast list in a manner that the corresponding broadcast content is the preferred content or is able to output the corresponding broadcast content as the preferred content in a broadcast output mode.

Figure 18A:
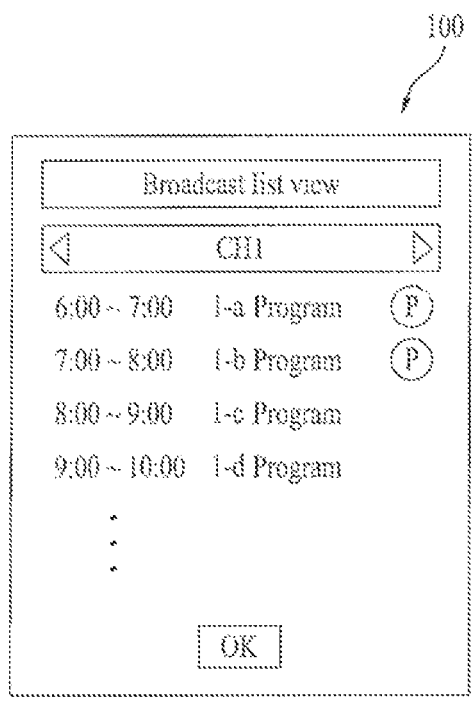
FIG. 18A and FIG. 18B are diagrams of screen configurations of a mobile terminal in case that content control information is preferred content setting information according to the present invention.

For instance, referring to FIG. 18A, the mobile terminal 100 is able to distinguishably display the broadcast content identified in the identifying step S620 on the broadcast list in a manner of indicating that the corresponding broadcast content is the preferred content [p].

Figure 18B:
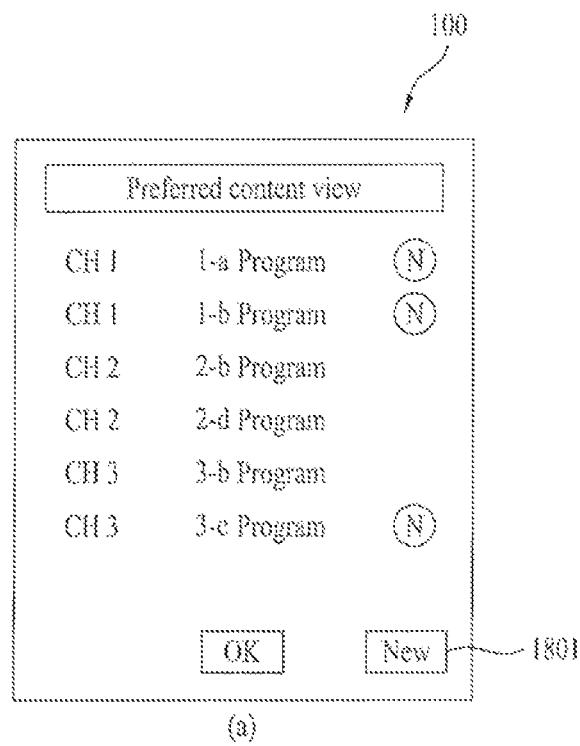
Figure 18B:
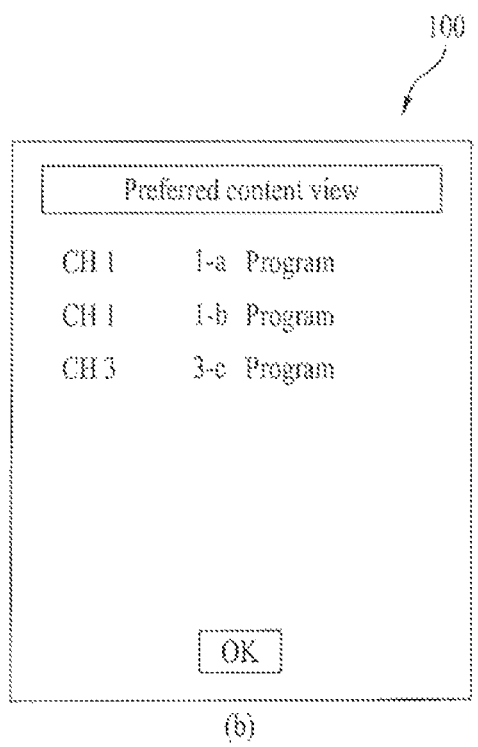

Referring to FIG. 18B (a), the mobile terminal 100 is able to display the broadcast content identified in the identifying step S620 as the preferred content on the preferred content list in a manner that the broadcast content identified in the identifying step S620 is merged with a previous preferred content. In this case, it is able to mark an identification indication (N) on the broadcast content identified in the identifying step S620 to indicate that the broadcast content identified in the identifying step S620 is newly designated to the preferred content.

Referring to FIG. 18B (b), the mobile terminal 100 deletes the previous preferred content from the preferred content list and is able to generate a preferred content list including the broadcast content identified in the identifying step S620 only. If a region 'New' 1801 is selected in FIG. 18B (a), the mobile terminal 100 is able to provide the screen configuration shown in FIG. 18B (b).

In case that a preferred content view function is selected in the broadcast output mode, the mobile terminal 100 is able to output a specific preferred content selected from the preferred content list shown in FIG. 18B by a user [not shown in the drawing].

Moreover, if the content control information is set to the blocked content setting information in the setting step S630, the controller 180 distinguishably displays the broadcast content identified in the identifying step S620 on the broadcast list in a manner of indicating that the broadcast content identified in the identifying step S620 is the blocked content or may not output the broadcast content in the broadcast output mode.

Figure 19A:
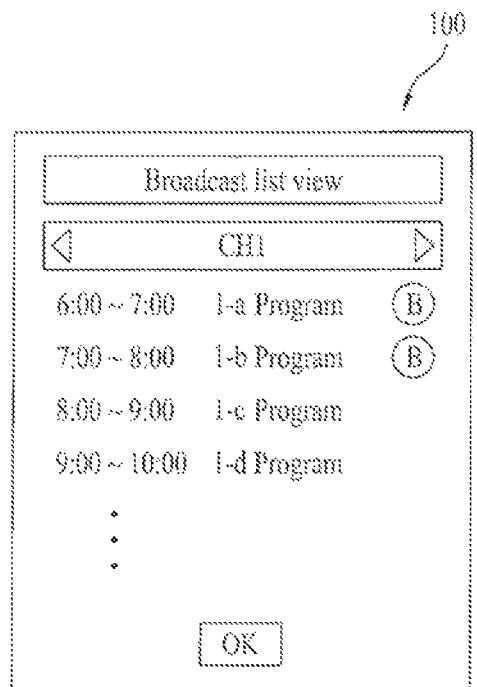
FIGS. 19A to 19C are diagrams of screen configurations of a mobile terminal in case that content control information is blocked content setting information according to the present invention.

For instance, referring to FIG. 19A, the mobile terminal 100 is able to distinguishably display the broadcast content identified in the identifying step S620 on the broadcast list in a manner of indicating that the broadcast content identified in the identifying step S620 is the blocked content [B]. Meanwhile, the mobile terminal 100 is able to separately provide a blocked content list [not shown in the drawing].

Figure 19B:
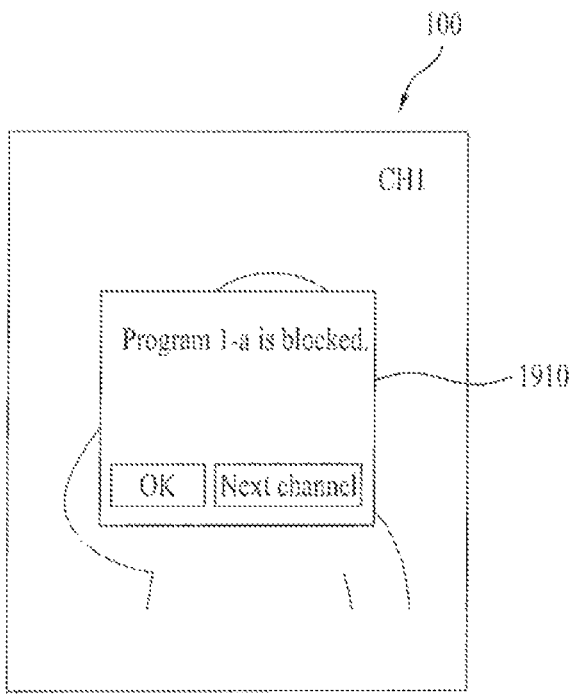

Referring to FIG. 19B, when a broadcast output mode is entered, if a blocked content is selected as an output target content, the mobile terminal 100 informs a user of the blocked content and is able to induce the user to select another broadcast channel or content.

Figure 19C:
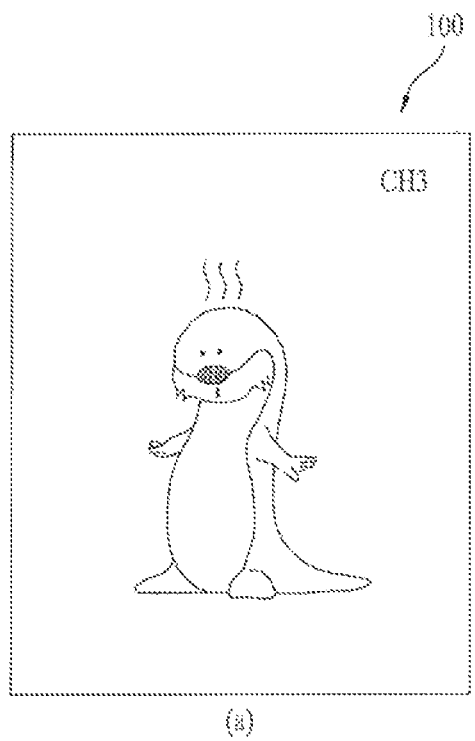
Figure 19C:
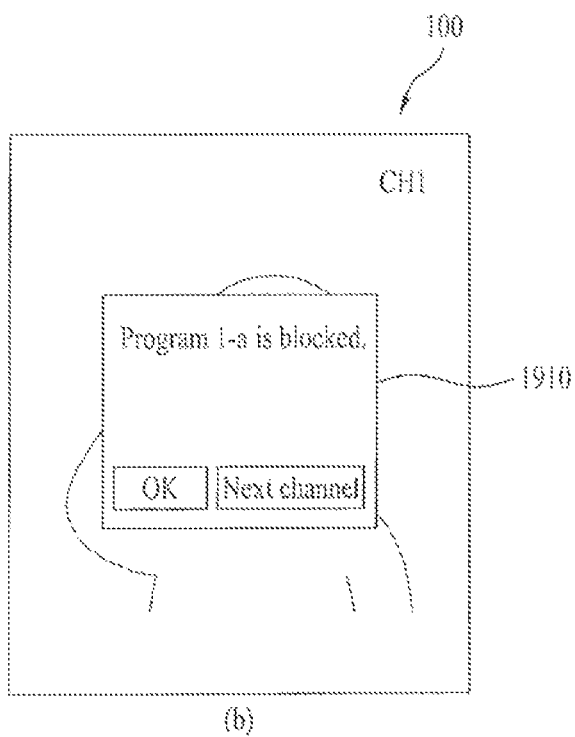

Referring to FIG. 19C, in case of switching to a broadcast channel on which a blocked content is provided in the course of outputting a specific broadcast content, the mobile terminal 100 informs a user of the blocked content and is able to induce the user to select another broadcast channel or content.

In case that the content control information is set to the allowable content setting information in the setting step S630, the controller 180 distinguishably displays the broadcast content identified in the identifying step S620 on the broadcast list in a manner of indicating that the corresponding broadcast content is the preferred content or is able to output the identified broadcast content in a broadcast output mode.

Figure 20A:
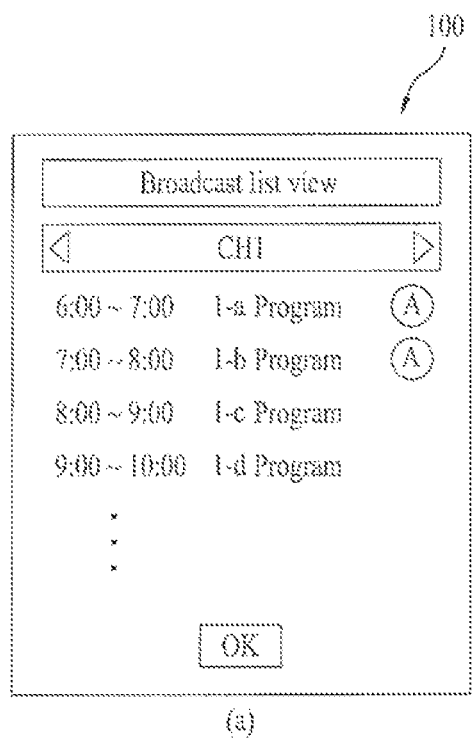
FIG. 20A and FIG. 20B are diagrams of screen configurations of a mobile terminal in case that content control information is allowable content setting information according to the present invention.
Figure 20A:
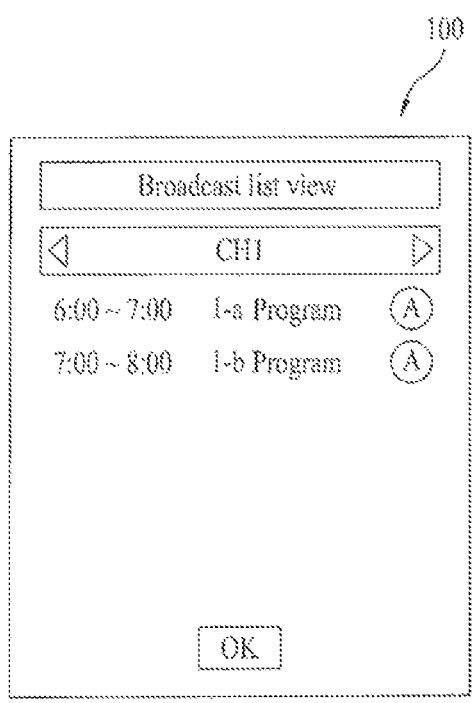

For instance, referring to FIG. 20A, the mobile terminal 100 distinguishably displays the broadcast content identified in the identifying step S620 on the broadcast list in a manner of indicating that the corresponding broadcast content is the allowable content [A] (a) or is able to separately provide an allowable content list (b).

Figure 20B:
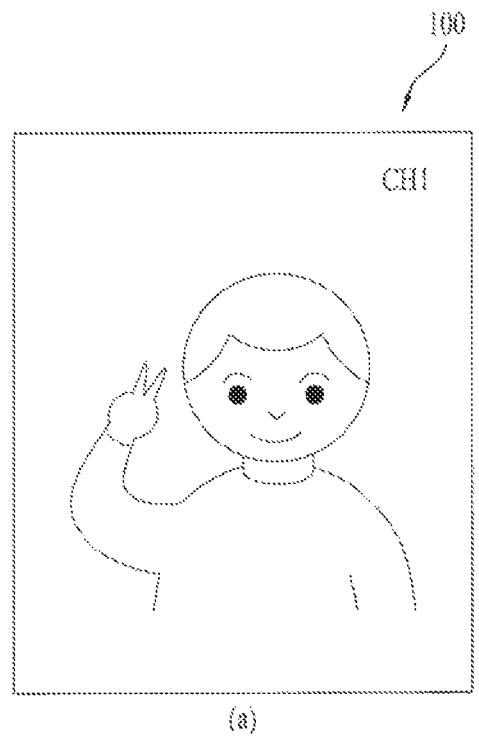
Figure 20B:
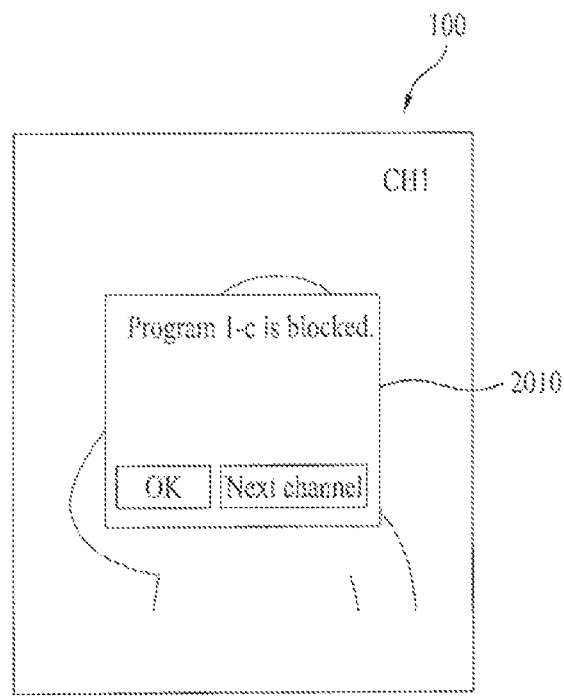

Referring to FIG. 20B, since the mobile terminal 100 is able to output the allocable content only, in case of switching to a broadcast channel, which does not provide the allowable content, in the course of outputting the allowable content [a], the mobile terminal 100 informs a user that the corresponding content is not the allowable content and is then able to induce the user to select a broadcast channel that provides the allowable content (b).

In case that the content control information is set to the viewing restriction condition setting information in the setting step S630, the controller 180 is able to output the broadcast content identified in the identifying step S620 to correspond to the viewing restriction condition.

Figure 21A:
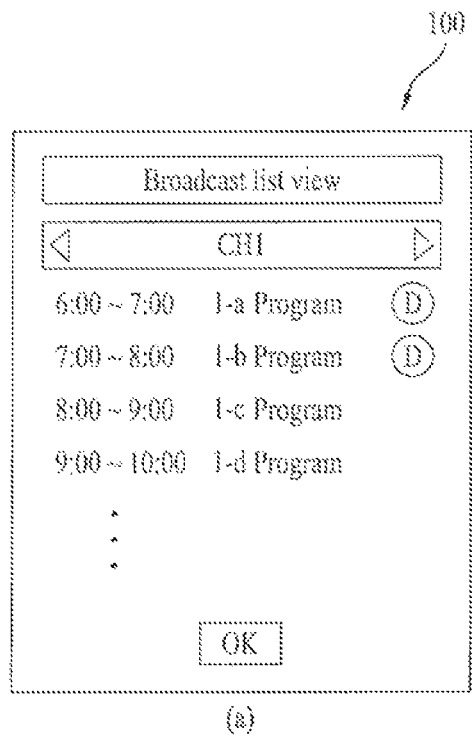
FIGS. 21A to 21C are diagrams of screen configurations of a mobile terminal in case that content control information is viewing restriction condition setting information according to the present invention.
Figure 21A:
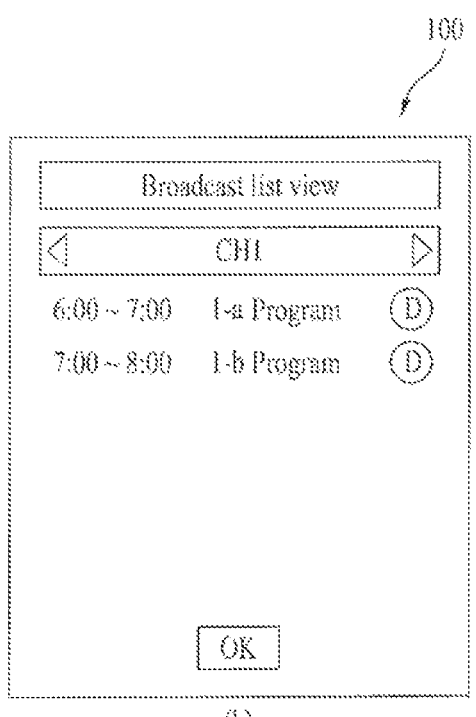

For instance, referring to FIG. 21A, in case that the viewing restriction condition setting information for allowing a viewing of a broadcast content, of which genre is drama, is set, the mobile terminal 100 distinguishably displays the broadcast content, of which genre is drama, on the broadcast list [ D ] (a) or is able to separately provide a content list including broadcast contents each of which genre is drama only (b).

Figure 21B:
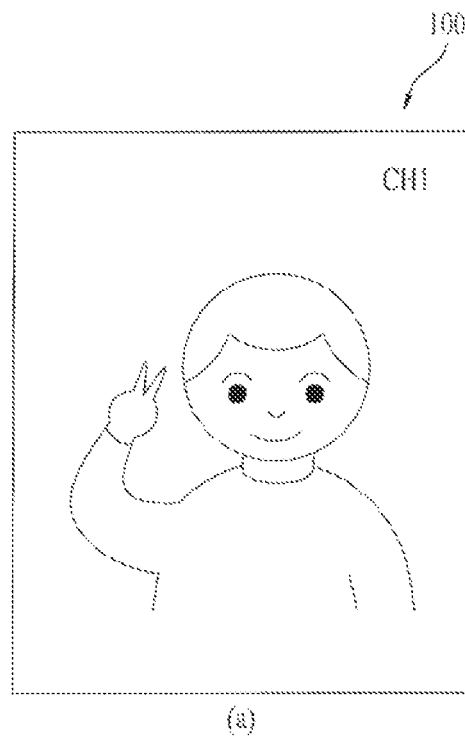
Figure 21B:
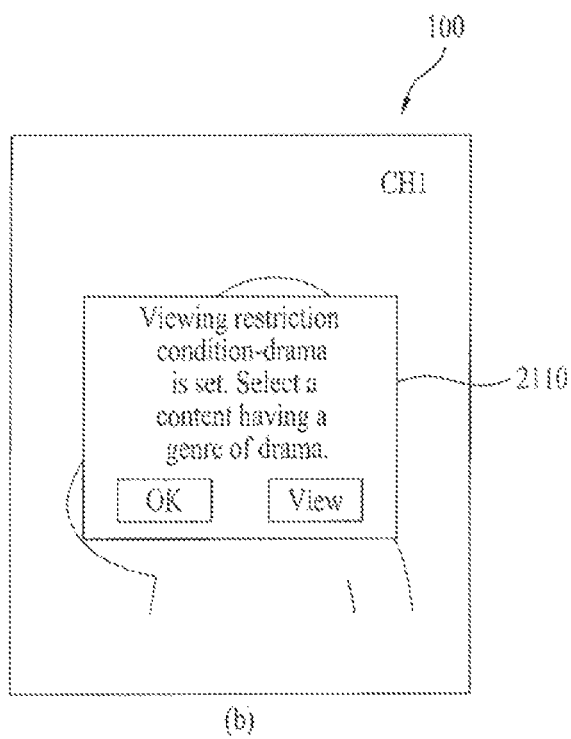

Referring to FIG. 21B, since the mobile terminal 100 is able to output the broadcast content of which genre is drama only, in case of switching to a broadcast channel providing a broadcast content, of which genre is not drama, in the course of outputting the broadcast content of which genre is drama (a), the mobile terminal 100 informs a user that it is unable to output the broadcast and is able to induce the user to select a broadcast channel providing a broadcast content of which genre is drama (b).

Figure 21C:
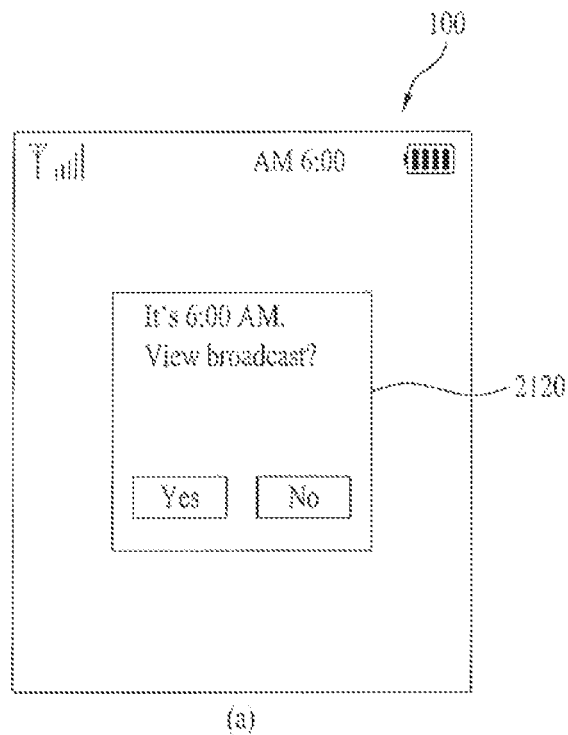
Figure 21C:
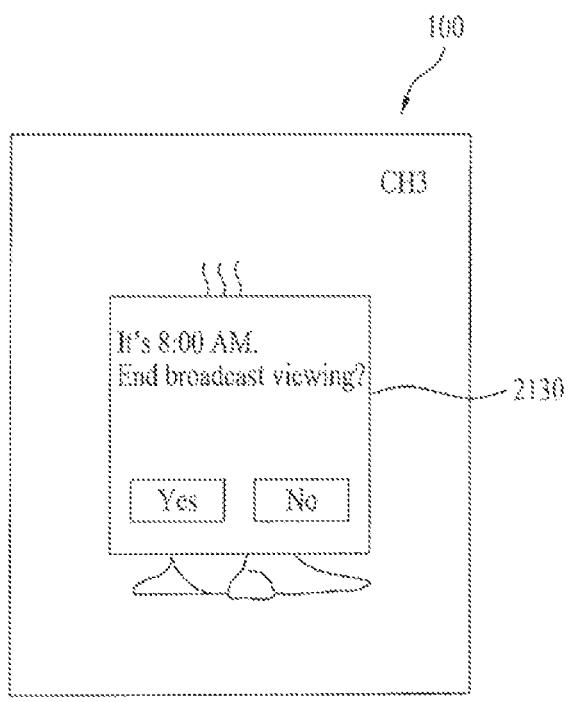

Referring to FIG. 21C (a), in case that a viewing restriction condition setting information is set to a broadcast viewing start point, the mobile terminal 100 enables a user to select whether to view a broadcast at the broadcast viewing start point. If the user selects to view the broadcast ('yes'), the mobile terminal 100 is able to output a random broadcast content or a specific broadcast content corresponding to content control information. Optionally, in case of detecting that the broadcast viewing start point is reached, the mobile terminal 100 is able to automatically output a random broadcast content or a specific broadcast content corresponding to content control information [not shown in the drawing].

Referring to FIG. 21C (b), in case that a viewing restriction condition setting information is set to a broadcast viewing end point, the mobile terminal 100 enables a user to select whether to terminate a broadcast at the broadcast viewing end point. If the user selects to terminate the broadcast ('yes'), the mobile terminal 100 is able to interrupt a broadcast output. Optionally, in case of detecting that the broadcast viewing end point is reached, the mobile terminal 100 is able to automatically interrupt a broadcast output [not shown in the drawing].

In case that a content control information is set to a viewing inducement content setting information in the setting step S630, the controller 180 enters a broadcast output mode and is then able to output a viewing induced broadcast content irrespective of a terminal state.

Figure 22A:
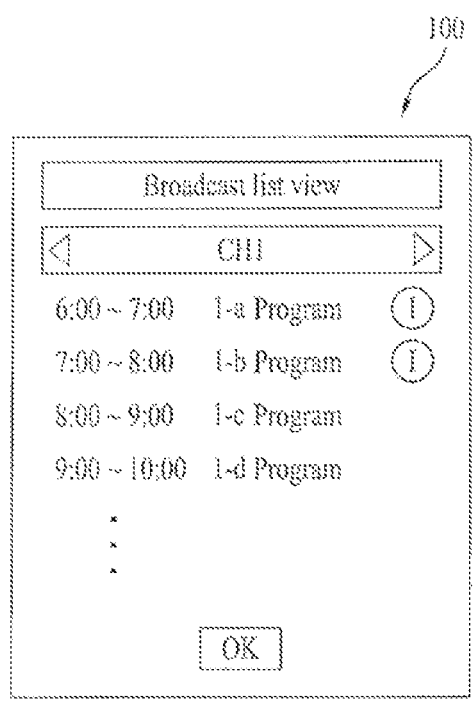
FIGS. 22A to 22C are diagrams of screen configurations of a mobile terminal in case that content control information is viewing inducement content setting information according to the present invention.

For instance, referring to FIG. 22A, the mobile terminal 100 is able to distinguishably display the broadcast content identified in the identifying step S620 on a broadcast list in a manner of indicating that the identified broadcast content is a viewing induced content [ ⚛ ]. Besides, an allowable content list can be separately provided [not shown in the drawing].

Figure 22B:
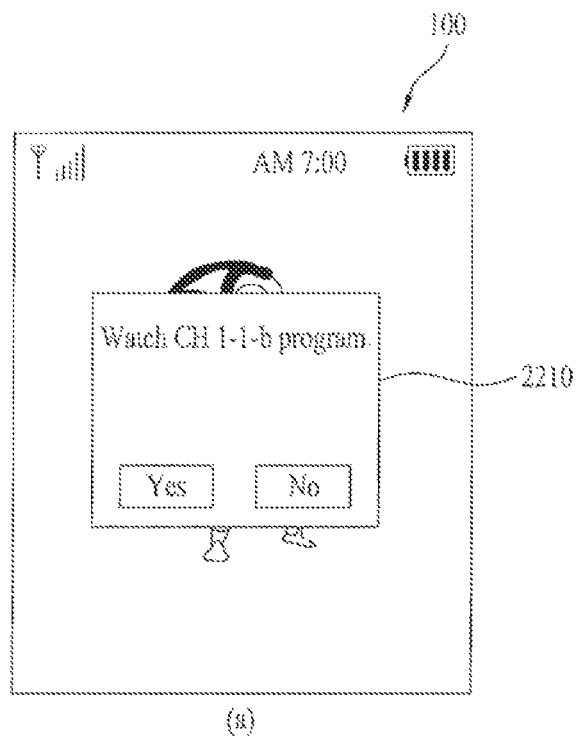
Figure 22B:
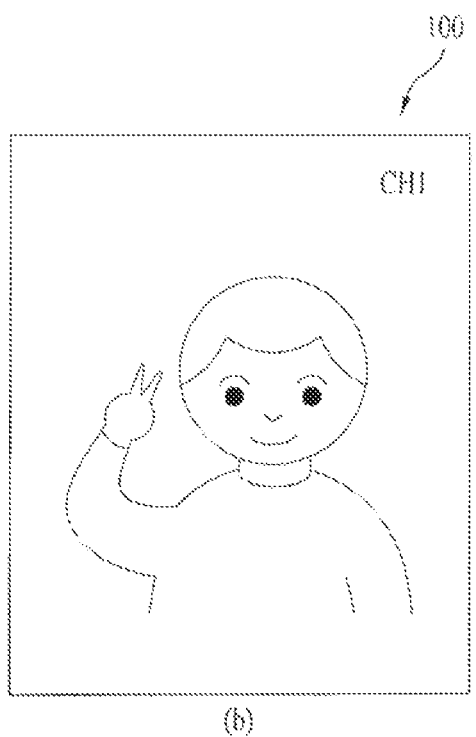

Referring to FIG. 22B, the mobile terminal 100 outputs a text indicating that a viewing induced content shall be viewed at a broadcast start point of the viewing induced content or at a timing point within a predetermined time from the broadcast start point of the viewing induced content [a] or is able to output a viewing induced content by automatically entering a broadcast mode at a broadcast start point of the viewing induced content [b]. In case that 'view a viewing induced content (OK)' is selected in FIG. 22B (a), it is able to configure the picture shown in FIG. 22B (b).

Figure 22C:
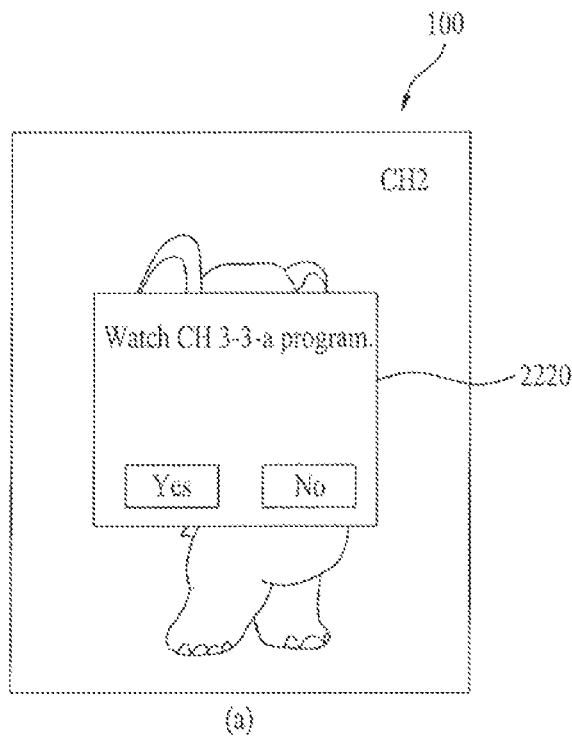
Figure 22C:
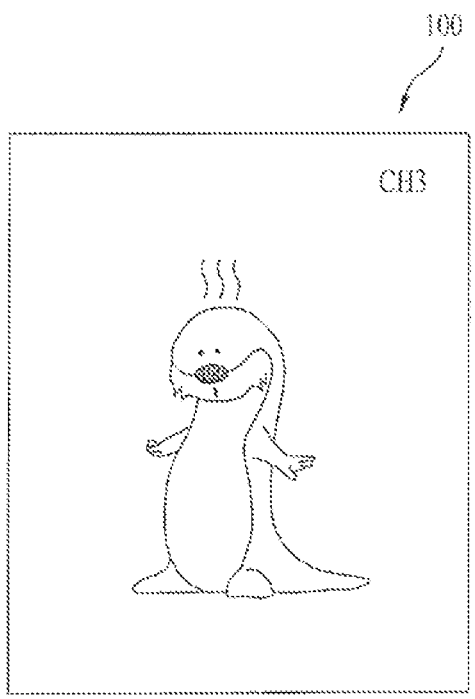

Operation shown in FIG. 22B can be performed irrespective of such a terminal mode as a standby mode, an application driven mode (e.g., voice/video call mode, message writing mode, MP3 driven mode, camera photographing mode, etc.) and the like. The operation can be performed in the course of outputting a broadcast content (except a viewing induced content) [FIG. 22C].

Moreover, in case that the content control information is set to comment information in the setting step S630, the controller 180 is able to output the comment information at a viewing start point of the broadcast content identified in the identifying step S620 or at a random timing point in the course of viewing.

Figure 23A:
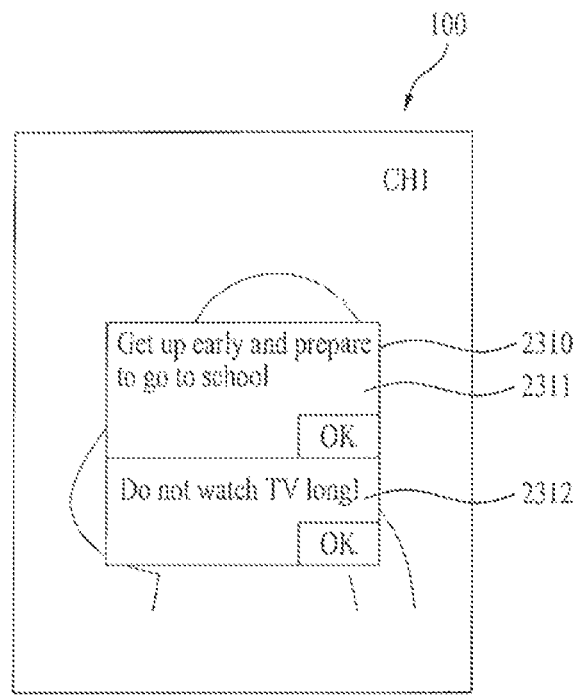
FIG. 23A and FIG. 23B are diagrams of screen configurations of a mobile terminal in case that content control information is comment setting information according to the present invention.
Figure 23B:
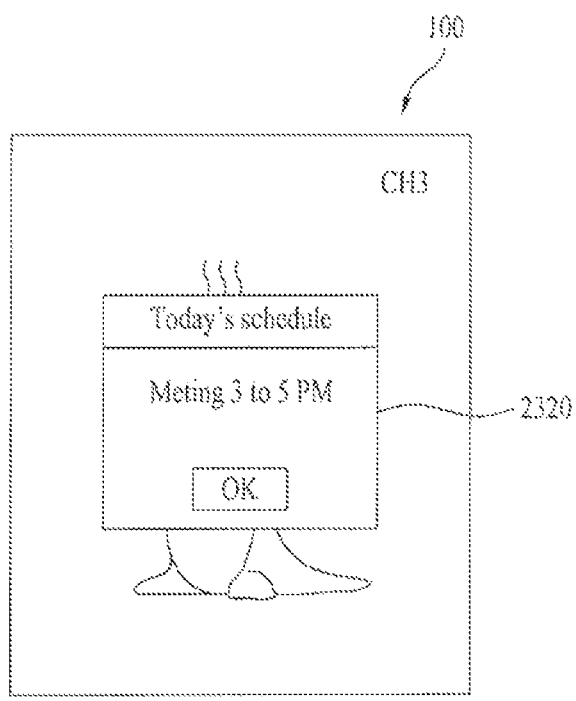

For instance, referring to FIG. 23A and FIG. 23B, at a broadcast viewing start point of a broadcast content, for which comment information is set, or at a random timing point in the course of viewing a broadcast, the mobile terminal 100 is able to output the set comment information. In this case, schedule information, as shown in FIG. 23B, can be contained in the comment information.

Meanwhile, in case that the content control information is set to the broadcast control validity condition information in the setting step S630, the controller 180 is able to output the broadcast content identified in the identifying step S620 according to the set content control information only if the validity condition of the content control information is met.

For instance, the controller 180 is able to control a content output operation according to the set content control information only if the controller 180 s located at 'my home' in case of setting the validity condition information to 'my home', only if it is between 8 P.M. and 10 P.M. in case of setting the validity condition information '8 P.M. to 10 P.M.', or only if it is during a predetermined period in case of setting the validity condition information to the period between 2009 Jun. 10 and 2009 Jul. 10.

According to the present invention, if a broadcast content output operation is not performed to correspond to the set content control information, the mobile terminal 100 is able to transmit announcement information, which indicates that the broadcast content output operation is not performed to correspond to the set content control information, to a correspondent party terminal using the wireless communication unit 110 under the control of the controller 180. For instance, the mobile terminal 100 includes a child terminal and the correspondent party terminal includes a parent terminal.

According to the present invention, the mobile terminal 1900 transmits a request signal for changing the set content control information to a correspondent party terminal using the wireless communication unit 110 under the control of the controller 180. The mobile terminal 100 is then able to receive information on changing the set content control information from the correspondent party terminal. If so, the controller 180 is able to change the set content control information according to the received change information. For instance, regarding content control information having blocked contents set to first to third contents, after a change request signal for requesting a release of the first content from the blocked contents has been transmitted, if a blocked content release allowed information of the first content is received as a change information, the controller 180 releases the first content from the blocked contents and then updates the content control information in a manner that the blocked contents are set to the second and third contents.

According to the present invention, the mobile terminal 100 is able to share its content control information or content control information of other terminals with other terminals via website. In particular, the mobile terminal 100 uploads its content control information to a web server linked to the corresponding website or downloads the content control information of another terminal from the web server.

According to one embodiment of the present invention, the above-described broadcast controlling methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Accordingly, the present invention provides the following effects and/or advantages.

First of all, the present invention is able to set broadcast control information on a broadcast content as an output target in a mobile terminal using an external terminal instead of manipulating the mobile terminal.

Secondly, the present invention is able to effectively control a broadcast content output operation according to broadcast control information set by an external terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a wireless communication unit configured to receive broadcast control information corresponding to broadcast content from an external terminal, the received broadcast control information including at least preferred content setting information, blocked content setting information, allowable content setting information, viewing restriction condition setting information, viewing inducement content setting information, broadcast control validity condition information, or comment information, and validity conditions corresponding to at least a predetermined place, a predetermined time, or a predetermined date;
an output unit configured to output the broadcast content; and
a controller configured to:
identify the broadcast content corresponding to the received broadcast control information using broadcast relevant information, and
apply the received broadcast control information to the identified broadcast content and control the output unit to perform an output operation of the identified broadcast content according to the applied broadcast control information only when at least a current place of the mobile terminal, a current time, or a current date satisfy the validity conditions.

2. The mobile terminal of claim 1, wherein the broadcast control information further includes a list comprising a plurality of broadcast contents.

3. The mobile terminal of claim 1, wherein the controller is further configured to:
search the broadcast content using broadcast content identification information included in the broadcast relevant information and the broadcast control information; and
identify the searched broadcast content as the broadcast content corresponding to the received broadcast control information.

4. The mobile terminal of claim 1, wherein the controller is further configured to:
apply the preferred content setting information to the identified broadcast content when the broadcast control information includes the preferred content setting information; and
control the output unit to output the identified broadcast content to which the preferred content setting information was applied as preferred content.

5. The mobile terminal of claim 1, wherein the controller is further configured to:
apply the blocked content setting information to the identified broadcast content when the broadcast control information comprises the blocked content setting information; and
control the output unit to not output the identified broadcast content to which the preferred content setting information was applied.

6. The mobile terminal of claim 1, wherein the controller is further configured to:
apply the allowable content setting information to the identified broadcast content when the broadcast control information includes the allowable content setting information; and
control the output unit to output only the identified broadcast content to which the allowable content setting information was applied.

7. The mobile terminal of claim 1, wherein the controller is further configured to:
apply the viewing restriction condition setting information to the identified broadcast content when the broadcast control information includes the viewing restriction condition setting information; and
control the output unit to output the identified broadcast content corresponding to the applied viewing restriction condition setting information.

8. The mobile terminal of claim 1, wherein the controller is further configured to:
apply the viewing inducement content setting information to the identified broadcast content when the broadcast control information includes the viewing inducement content setting information; and
control the output unit to output the identified broadcast content irrespective of a terminal mode.

9. The mobile terminal of claim 1, wherein the controller is further configured to:
apply the broadcast control validity condition information to the identified broadcast content when the broadcast control information includes the broadcast control validity condition information; and
control the output unit to output the identified broadcast content according to the applied broadcast control validity condition information when a broadcast control validity condition of the applied broadcast control validity condition information is satisfied.

10. The mobile terminal of claim 1, wherein the wireless communication unit is further configured to:
transmit announcement information to a correspondent party terminal to indicate that the output operation of the identified broadcast content is not performed when the at least the current place of the mobile terminal, the current time, or the current date does not satisfy the validity conditions.

11. The mobile terminal of claim 1, wherein:
the wireless communication unit is further configured to transmit a change request signal to a correspondent party terminal that is controlled by the controller in order to change the applied broadcast control information and receive change information related to the applied broadcast control information; and
the controller is further configured to change the applied broadcast control information according to the received change information.

12. A method of controlling a broadcast in a mobile terminal, the method comprising:
receiving broadcast control information corresponding to broadcast content from an external terminal, the received broadcast control information including at least preferred content setting information, blocked content setting information, allowable content setting information, viewing restriction condition setting information, viewing inducement content setting information, broadcast control validity condition information, or comment information, and validity conditions corresponding to at least a predetermined place, a predetermined time, or a predetermined date;

identifying the broadcast content corresponding to the received broadcast control information using broadcast relevant information; and applying the received broadcast control information to the identified broadcast content and controlling an output operation of the identified broadcast content according to the applied broadcast control information only when at least a current place of the mobile terminal, a current time, or a current date satisfy the validity conditions.

13. The method of claim 12, further comprising:
searching the broadcast content using broadcast content identification information included in the broadcast relevant information and the broadcast control information; and identifying the searched broadcast content as the broadcast content corresponding to the received broadcast control information.

14. The method of claim 13, further comprising:
transmitting announcement information to a correspondent party terminal to indicate that the broadcast content is not performed control information when the at least the current place of the mobile terminal, the current time, or the current date does not satisfy the validity conditions.

15. The method of claim 12, further comprising:
transmitting a change request signal to a correspondent party terminal in order to change the applied broadcast control information;
receiving change information related to the applied broadcast control information; and
changing the applied broadcast control information according to the received change information.

16. A communication system comprising:
a broadcast control information input terminal comprising:
   a wireless communication unit configured to receive broadcast relevant information and transmit broadcast control information,
   an user input unit configured to receive user input corresponding to a broadcast control information designating action for broadcast content, and
   a controller configured to generate broadcast control information corresponding to broadcast content based on the user's input; and
a mobile terminal comprising:
   a wireless communication unit configured to receive the generated broadcast control information from the broadcast control information input terminal,
   an output unit configured to output broadcast content, and
   a controller configured to:
      identify the output broadcast content corresponding to the received broadcast control information using broadcast relevant information,
      apply the received broadcast control information to the identified broadcast content, and
      control the output unit to perform an output operation of the identified broadcast content according to the applied broadcast control information,
   wherein the output unit is further configured to output the broadcast content using the broadcast control information.

17. The communication system of claim 16, wherein the broadcast control information comprises at least preferred content setting information, blocked content setting information, allowable content setting information, viewing restriction condition setting information, viewing inducement content setting information, broadcast control validity condition information, or comment information.

18. The communication system of claim 16, wherein:
the received broadcast control information includes validity conditions corresponding to at least a predetermined place, a predetermined time, or a predetermined date; and
the controller is further configured to apply the received broadcast control information to the identified broadcast content only when at least a current place of the mobile, a current time, or a current date satisfy the validity conditions.

* * * * *